(12) United States Patent
Wu et al.

(10) Patent No.: US 7,481,956 B2
(45) Date of Patent: Jan. 27, 2009

(54) METHOD FOR MOLDING CASTABLE LIGHT STABLE POLYURETHANE AND POLYUREA GOLF BALLS

(75) Inventors: Shenshen Wu, North Dartmouth, MA (US); Manjari Kuntimaddi, Plymouth, MA (US); Shawn Ricci, New Bedford, MA (US); Peter Serdahl, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 903 days.

(21) Appl. No.: 10/898,293

(22) Filed: Jul. 26, 2004

(65) Prior Publication Data

US 2006/0017201 A1    Jan. 26, 2006

(51) Int. Cl.
B28B 7/22 (2006.01)
B29C 65/00 (2006.01)
B29C 49/00 (2006.01)

(52) U.S. Cl. .................. 264/255; 264/248; 264/571
(58) Field of Classification Search ................ 264/248, 264/255, 271
See application file for complete search history.

(56) References Cited

U.S. PATENT DOCUMENTS

| | | | |
|---|---|---|---|
| 4,560,168 A | 12/1985 | Aoyama | 273/232 |
| 4,925,193 A | 5/1990 | Melvin et al. | 273/232 |
| 4,960,281 A | 10/1990 | Aoyama | 273/232 |
| 5,006,297 A | 4/1991 | Brown et al. | 264/234 |
| 5,248,878 A | 9/1993 | Ihara | 219/121.69 |
| 5,249,804 A | 10/1993 | Sanchez | 273/232 |
| 5,334,673 A | 8/1994 | Wu | 273/235 R |
| 5,403,453 A | 4/1995 | Roth et al. | 204/164 |
| 5,456,972 A | 10/1995 | Roth et al. | 428/224 |
| 5,484,870 A | 1/1996 | Wu | 528/28 |
| 5,562,552 A | 10/1996 | Thurman | 473/379 |
| 5,575,477 A | 11/1996 | Hwang | 473/379 |
| 5,688,191 A | 11/1997 | Cavallaro et al. | 473/373 |
| 5,692,974 A | 12/1997 | Wu et al. | 473/377 |
| 5,713,801 A | 2/1998 | Aoyama | 473/354 |
| 5,733,428 A | 3/1998 | Calabria et al. | 264/134 |
| 5,803,831 A | 9/1998 | Sullivan et al. | 473/374 |
| 5,820,488 A | 10/1998 | Sullivan et al. | 473/374 |
| 5,849,168 A | 12/1998 | Lutz | 264/755 |
| 5,885,172 A | 3/1999 | Hebert et al. | 473/354 |
| 5,908,358 A | 6/1999 | Wu | 473/378 |
| 5,919,100 A | 7/1999 | Boehm et al. | 473/354 |
| 5,957,787 A | 9/1999 | Hwang | 473/379 |
| 5,965,669 A | 10/1999 | Cavallaro et al. | 252/221 |
| 5,981,654 A | 11/1999 | Rajagopalan | 525/66 |
| 5,981,658 A | 11/1999 | Rajagopalan et al. | 525/72 |
| 6,056,842 A | 5/2000 | Dalton et al. | 156/243 |
| 6,075,223 A | 6/2000 | Harrison | 219/121.85 |
| 6,096,255 A | 8/2000 | Brown et al. | 264/248 |
| 6,129,881 A | 10/2000 | Puniello | 264/278 |
| 6,149,535 A | 11/2000 | Bissonnette et al. | 473/354 |
| 6,180,040 B1 | 1/2001 | Ladd et al. | 264/248 |
| 6,180,722 B1 | 1/2001 | Dalton et al. | 525/193 |
| 6,200,512 B1 | 3/2001 | Dewanjee et al. | 264/250 |
| 6,207,784 B1 | 3/2001 | Rajagopalan | 528/71 |
| 6,213,898 B1 | 4/2001 | Ogg | 473/383 |
| 6,235,230 B1 | 5/2001 | Puniello | 264/278 |
| 6,290,615 B1 | 9/2001 | Ogg | 473/378 |
| 6,290,797 B1 | 9/2001 | Gosetti et al. | 156/228 |
| 6,315,915 B1 | 11/2001 | Hebert et al. | 216/67 |
| 6,338,684 B1 | 1/2002 | Winfield et al. | 473/378 |
| 6,358,161 B1 | 3/2002 | Aoyama | 473/383 |
| 6,379,138 B1 | 4/2002 | Puniello et al. | 425/116 |
| 6,383,092 B1 | 5/2002 | Ogg | 473/378 |
| 6,409,615 B1 | 6/2002 | McGuire et al. | 473/383 |
| 6,462,303 B1 | 10/2002 | Brown | 219/121.69 |
| 6,528,578 B2 | 3/2003 | Wu | 524/750 |
| 6,610,812 B1 | 8/2003 | Wu et al. | 528/60 |
| 2001/0009310 A1* | 7/2001 | Hebert et al. | 264/129 |
| 2001/0018375 A1* | 8/2001 | Hayashi et al. | 473/371 |
| 2001/0019971 A1* | 9/2001 | Hayashi et al. | 473/371 |
| 2002/0025862 A1* | 2/2002 | Sullivan et al. | 473/374 |
| 2002/0028885 A1* | 3/2002 | Sullivan et al. | 525/221 |
| 2002/0082358 A1* | 6/2002 | Ohira et al. | 525/418 |
| 2003/0096936 A1* | 5/2003 | Wu et al. | 528/76 |

OTHER PUBLICATIONS

U.S. Appl. No. 10/437,387, filed May 14, 2003 entitled "Use of Metallic Mercaptothiazole or Metallic Mercaptobenzothiazole in Golf Ball Compositions".

U.S. Appl. No. 10/437,386, filed May 14, 2003 entitled "Use of Metallic Mercaptothiazole or Metallic Mercaptobenzothiazole in Golf Ball Compositions".

U.S. Appl. No. 10/228,311, filed Aug. 27, 2002 entitled "Golf Balls Comprising Light Stable Materials and Methods of Making the Same".

U.S. Appl. No. 10/167,744, filed Jun. 13, 2002 entitled "Golf Ball with Multiple Cover Layers".

(Continued)

Primary Examiner—Philip C Tucker
Assistant Examiner—Michael N Orlando
(74) Attorney, Agent, or Firm—Hanify & King, P.C.

(57) ABSTRACT

The present invention relates to a method of molding cosmetically defect-free golf ball components that contain light stable polyurethane, polyurea, or blends thereof at processing temperatures that are lower than conventional processing temperatures used for aromatic formulations. The present invention also relates to a golf ball component formed by using such a method.

32 Claims, No Drawings

OTHER PUBLICATIONS

U.S. Appl. No. 10/138,304, filed May 6, 2002 entitled "Golf Ball Incorporating Grafted Metallocene Catalyzed Polymer Blends".

U.S. Appl. No. 10/078,417, filed Feb. 21, 2002 entitled "Dimple Patterns for Golf Balls".

U.S. Appl. No. 10/028,826, filed Dec. 28, 2001 entitled "Golf Ball With A Radially Oriented Transversely Isotropic Layer and Manufacture of Same".

U.S. Appl. No. 10/012,538, filed Dec. 12, 2001 entitled "Method of Forming Indicia on a Golf Ball".

U.S. Appl. No. 09/989,191, filed Nov. 21, 2001 entitled "Golf Ball Dimples with a Catenary Curve Profile".

U.S. Appl. No. 09/842,829, filed Apr. 27, 2001 entitled "All Rubber Golf Ball With Hoop-Stress Layer".

U.S. Appl. No. 09/841,910, filed Apr. 27, 2001 entitled "Multilayer Golf Ball With Hoop-Stress Layer".

U.S. Appl. No. 09/742,435, filed Dec. 22, 2000 entitled "Split Vent Pin for Injection Molding".

U.S. Appl. No. 09/717,136, filed Nov. 22, 2000 entitled "Method of Making Golf Balls".

U.S. Appl. No. 09/442,845, filed Nov. 18, 1999 entitled "Mold For A Golf Ball".

* cited by examiner

METHOD FOR MOLDING CASTABLE LIGHT STABLE POLYURETHANE AND POLYUREA GOLF BALLS

FIELD OF THE INVENTION

The present invention relates to a method of molding cosmetically defect-free golf ball components that contain light stable polyurethane, polyurea, or blends thereof at processing temperatures that are lower than conventional processing temperatures used for aromatic formulations.

BACKGROUND OF THE INVENTION

Various golf balls, golf ball layers, and methods of making golf balls are generally known in the art. The centers may be fluid-filled or solid. Such golf balls may have a multilayer construction having one or more wound and/or solid layers. Golf balls may comprise one-piece constructions or they may include several layers including a core, one or more intermediate layers and an outer cover that surrounds any intermediate layer and the core.

Regardless of the form of the ball, players not only seek a golf ball that embodies a beneficial combination of properties, for example, such as maximum distance, which requires a high initial velocity upon impact, but they desire golf balls that are aesthetically and cosmetically free from defects. It is especially desirable to manufacture a golf ball having covers that are aesthetically and cosmetically free from defects as the cover is the outermost component visible to golfers.

Golf balls are typically manufactured by various molding processes, whether one-component or multi-component balls. The cover is then formed over the core and intermediate boundary layers, if present, through casting, compression molding, and/or injection molding.

The cover is typically made from any number of thermoplastic or thermosetting materials, including thermoplastic resins such as ionomeric, polyester, polyetherester or polyetheramide resins; thermoplastic or thermoset polyurethanes or polyureas; natural or synthetic rubbers, such as balata (natural or synthetic) or polybutadiene; or some combination of the above.

Polyurethanes have also been recognized as useful materials for golf ball covers since about 1960. The resulting golf balls are durable, while at the same time maintaining the "feel" of a balata ball. Because the polyurethanes used to make the covers of such golf balls generally contain an aromatic component, e.g., aromatic diisocyanate, polyol, or polyamine, they are susceptible to discoloration upon exposure to light, particularly ultraviolet (UV) light. To slow down the discoloration, light and UV stabilizers, e.g., Tinuvin 770, 765, and 328, are added to these aromatic polymeric materials. However, to further ensure that the covers formed from aromatic polyurethanes do not appear discolored, the covers are painted with white paint and then covered with a clear coat to maintain the white color of the golf ball. Polyureas have also been proposed as cover materials for golf balls. For instance, a polyurea composition comprising the reaction product of an organic diisocyanate and an organic amine, each having at least two functional groups, is known.

Conventionally, castable aromatic polyurethane elastomers have been molded using molds that are preheated between 140° F. to 180° F. and cores that are preheated between 100° F. and 140° F. Such preheating is thought to facilitate a reasonable gel time to allow cores to be centered into the castable material and the cover to be molded over the cores. Golf balls molded from preheated cores also help to reduce seam failures at the time of demolding because of reduced core expansion rate of the preheated cores during molding. However, casting aliphatic polyurethane and polyurea elastomers under such conditions is problematic, particularly because of the formation of surface defects. Balls typically molded with preheated cores and/or preheated molds to these temperatures result in voids and blisters.

Accordingly, there is a need for a method of molding cosmetically defect free golf ball components that are comprised of aliphatic polyurethane elastomers or aliphatic polyurea elastomers. The methods of the present invention provide for such a method.

SUMMARY OF THE INVENTION

The present invention relates to a method of forming a cosmetically defect-free golf ball component comprising the steps of providing a golf ball precursor; mixing at least one of a saturated polyurea prepolymer, a saturated polyurethane prepolymer, or mixture thereof and at least one saturated curing agent to form a castable reactive liquid material; filling a first set of mold halves with a first amount of the material; lowering the golf ball precursor into the first set of mold halves after a first predetermined time, wherein the golf ball precursor has a temperature of about 120° F. or below and is held by vacuum for a second predetermined time, and wherein the second predetermined time is sufficient for complete exothermic reaction of the first amount of material; releasing the golf ball precursor from the vacuum providing a partially covered golf ball precursor; filling a second set of mold halves with a second amount of the material, wherein the first and second amounts are substantially similar, and wherein an exothermic reaction of the second amount commences; and mating the second set of mold halves with the partially covered precursor after a third predetermined time, wherein the mold halves are mated for a fourth predetermined time that is sufficient for complete exothermic reaction of the second amount of material, forming a cosmetically defect-free golf ball component.

Preferably, the defect-free golf ball component is a core layer, intermediate layer or a cover layer. In one embodiment, the golf ball precursor comprises a center and optionally at least one of a core layer, an intermediate layer or a cover layer. In another embodiment, the golf ball precursor temperature is between about 65° F. to about 120° F. Preferably, the golf ball precursor temperature is between about 70° F. to about 115° F. In another embodiment, the golf ball precursor is cooled to a temperature of between about 20° F. to about 65° F.

In another embodiment, the method further comprises post curing the defect-free golf ball component at room temperature for from about 20 minutes to about 24 hours for from about 100° F. to about 180° F. for a time of from about 1 minutes to about 30 minutes. In yet another embodiment, the method further comprises a predetermined delay time after forming the golf ball component and prior to post curing, wherein the predetermined delay time is from about 60 seconds to about 6 hours.

In one embodiment, the at least one polyurea prepolymer, polyurethane prepolymer, or mixture thereof and the at least one saturated curing agent is mixed at a temperature of between about 70° F. to about 175° F. prior to filling the first set or second set of mold halves. In another embodiment, the first and second mold halves are each independently at room temperature or preheated to a temperature of between about 65° F. to about 140° F. In a preferred embodiment, the temperature of the first and second mold halves are each independently at a temperature of between about 65° F. to about 100° F.

In one embodiment, the first predetermined time and third predetermined time each is between about 30 seconds to about 120 seconds. In another embodiment, the second predetermined time and fourth predetermined time each is independently between about 3 seconds and about 30 seconds.

In another embodiment, the at least one polyurethane prepolymer is formed by contacting or reacting at least one saturated polyisocyanates with at least one saturated polyol and the at least one polyurea prepolymer is formed by contacting or reacting at least one saturated polyisocyanate with at least one saturated polyamine. In a preferred embodiment, the at least one saturated polyisocyanate has the generic structure: $(O=C=N)_n-R-(N=C=O)_{n'}$, wherein n and n' are each independently 1, 2 or 3, R is a substituted or unsubstituted cyclic, linear or branched saturated hydrocarbon moiety containing from about 1 to about 20 carbon atoms. In another preferred embodiment, the at least one saturated polyisocyanate is selected from the group consisting of ethylene diisocyanate; propylene-1,2-diisocyanate; tetramethylene-1,2-diisocyanate; tetramethylene-1,3-diisocyanate; tetramethylene-1,4-diisocyanate; 1,6-hexamethylene-diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophoronediisocyanate (IPDI); isocyanurate of HDI; uretdione of HDI; biuret of HDI; triisocyanate of 2,2,4-trimethyl-1,6-hexane diisocyanate (TMDI); 4,4'-dicyclohexylmethane diisocyanate ($H_{12}$MDI); and mixtures thereof.

In another preferred embodiment, the at least one saturated polyol is selected from the group consisting of a polyether polyol, a polycaprolactone polyol, a polyester polyol, a polycarbonate polyol, a hydrocarbon polyol, a glycerol; a castor oil and derivatives thereof; a saturated hydroxy-terminated hydrocarbon polyol; an acrylic polyol; an acid-functionalized polyol based on a carboxylic, sulfonic, or phosphoric acid group; a dimer alcohol converted from the saturated dimerized fatty acid; and a mixture thereof.

In a more preferred embodiment, the at least one saturated polyol is selected from the group consisting of polytetramethylene ether glycol (PTMEG), modified polytetramethylene ether glycol (PTG-L), poly(oxyethylene) glycol, poly(oxypropylene) glycol, poly(ethylene oxide capped oxypropylene) glycol, diethylene glycol initiated polycaprolactone, propylene glycol initiated polycaprolactone, 1,4-butanediol initiated polycaprolactone, trimethylol propane initiated polycaprolactone, neopentyl glycol initiated polycaprolactone, 1,6-hexanediol initiated polycaprolactone, polytetramethylene ether glycol (PTMEG) initiated polycaprolactone, polyethylene adipate glycol, polyethylene propylene adipate glycol, polybutylene adipate glycol, polyethylene butylene adipate glycol, polyhexamethylene adipate glycol, polyhexamethylene butylene adipate glycol, poly (hexamethylene carbonate) glycol, hydroxy-terminated liquid isoprene rubber (LIR), hydroxy-terminated polybutadiene polyol, and mixtures thereof.

In another preferred embodiment, the at least one saturated polyamine is a primary or secondary $C_1$-$C_{20}$ substituted or unsubstituted aliphatic or cycloaliphatic polyamine having 2 to 6 amino groups. In a more preferred embodiment, the at least one saturated polyamine is selected from the group consisting of a polytetramethylene ether diamine, a polyoxypropylene diamine, a poly(ethylene oxide-capped oxypropylene) ether diamine, a triethyleneglycoldiamine, a propylene oxide-based triamine, a trimethylolpropane-based triamine, a glycerin-based triamine, diamines prepared from dibasic acids, dimerized fatty acids, amine-terminated polybutadiene, and mixtures thereof.

In a preferred embodiment, the at least one saturated curing agent is a hydroxy-terminated curing agent, an amine-terminated curing agent, or a mixture thereof. In another preferred embodiment, the at least one hydroxy-terminated curing agent is selected from the group consisting of ethylene glycol, diethylene glycol, polyethylene glycol, propylene glycol, 2-methyl-1,3-propanediol, 2,-methyl-1,4-butanediol, dipropylene glycol, polypropylene glycol, 1,2-butanediol, 1,3-butanediol, 1,4-butanediol, 2,3-butanediol, 2,3-dimethyl-2,3-butanediol, trimethylolpropane, cyclohexyldimethylol, triisopropanolamine, tetra-(2-hydroxypropyl)-ethylene diamine, diethylene glycol di-(aminopropyl) ether, 1,5-pentanediol, 1,6-hexanediol, 1,3-bis-(2-hydroxyethoxy) cyclohexane, 1,4-cyclohexyldimethylol, 1,3-bis-[2-(2-hydroxyethoxy) ethoxy] cyclohexane, 1,3-bis-{2-[2-(2-hydroxyethoxy) ethoxy] ethoxy} cyclohexane, trimethylolpropane, polytetramethylene ether glycol, 3,3'-dimethyl-4,4'-bis-(sec-butylamino)-dicyclohexylmethane; N,N'-diisopropyl-isophorone diaamine; 3-{[(5-amino-1,3,3-trimethylcyclohexyl)methyl]amino}-propanenitrile and mixtures thereof.

In yet another preferred embodiment, the at least one amine-terminated curing agent is selected from the group consisting of ethylene diamine, hexamethylene diamine, 1-methyl-2,6-cyclohexyl diamine, tetrahydroxypropylene ethylene diamine, 2,2,4- and 2,4,4-trimethyl-1,6-hexanediamine, 4,4'-bis-(sec-butylamino)-dicyclohexylmethane, 1,4-bis-(sec-butylamino)-cyclohexane, 1,2-bis-(sec-butylamino)-cyclohexane, derivatives of 4,4'-bis-(sec-butylamino)-dicyclohexylmethane, 4,4'-dicyclohexylmethane diamine, 1,4-cyclohexane-bis-(methylamine), 1,3-cyclohexane-bis-(methylamine), diethylene glycol di-(aminopropyl) ether, 2-methylpentamethylene-diamine, diaminocyclohexane, diethylene triamine, triethylene tetramine, tetraethylene pentamine, propylene diamine, 1,3-diaminopropane, dimethylamino propylamine, diethylamino propylamine, imido-bis-propylamine, monoethanolamine, diethanolamine, triethanolamine, monoisopropanolamine, diisopropanolamine, isophoronediamine, 3,3'-dimethyl-4,4'-bis-(sec-butylamino)-dicyclohexylmethane; N,N'-diisopropyl-isophorone diamine; 3-{[(5-amino-1,3,3-trimethylcyclohexyl)methyl]amino}-propanenitrile and mixtures thereof.

In one embodiment, the at least one of a saturated polyurea prepolymer, the saturated polyurethane prepolymer, or mixture thereof and the at least one saturated curing agent is further mixed with one or more catalysts. In a preferred embodiment, the one or more catalysts is selected from the group consisting of bismuth catalyst, zinc octoate, di-butyltin dilaurate, di-butyltin diacetate, tin (II) chloride, tin (IV) chloride, di-butyltin dimethoxide, dimethyl-bis[1-oxonedecyl) oxy] stannane, di-n-octyltin bis-isooctyl mercaptoacetate, triethylenediamine, triethylamine, tributylamine, oleic acid, acetic acid; delayed catalysts, and mixtures thereof. In another preferred embodiment, the one or more catalysts are present in an amount from about 0.001 percent to about 5 percent by weight of the castable reactive liquid material.

The present invention also encompasses a cosmetically defect-free golf ball component formed from a method comprising the steps of providing a golf ball precursor; mixing at least one of a saturated polyurea prepolymer, a saturated polyurethane prepolymer, or mixture thereof and at least one saturated curing agent to form a castable reactive liquid material; filling a first set of mold halves with a first amount of the material; lowering the golf ball precursor into the first set of mold halves after a first predetermined time, wherein the golf ball precursor has a temperature of about 120° F. or below and is held by vacuum for a second predetermined time, and wherein the second predetermined time is sufficient for complete exothermic reaction of the first amount of material; releasing the golf ball precursor from the vacuum providing a partially covered golf ball precursor; filling a second set of mold halves with a second amount of the material, wherein the first and second amounts are substantially similar, and wherein an exothermic reaction of the second amount commences; and mating the second set of mold halves with the partially covered precursor after a third predetermined time, wherein the mold halves are mated for a fourth predetermined time that is sufficient for complete exothermic reaction of the second amount of material.

DETAILED DESCRIPTION OF THE INVENTION

The present invention provides for a method of forming golf ball components using aliphatic polyurethane elastomers, aliphatic polyurea elastomers, or blends thereof. In particular, the method solves the problem of cosmetic defects associated with forming golf ball components under conditions typically used for golf ball components made from aromatic polyurethane and aromatic polyurea. The polyurethane elastomers and the polyurea elastomers of the invention are preferably light stable, or saturated. Light stability may be accomplished in a variety of ways. For example, the compositions of the invention may include only saturated components, i.e., saturated or aliphatic prepolymers and saturated curing agents.

This invention relates to golf balls having a core, a cover and, optionally, an intermediate layer disposed concentrically adjacent to the core and particularly methods of forming such golf ball components. The invention also relates to golf balls having a double core, a multi-layer core, a double cover, a multi-layer cover or one or more intermediate layer. At least one of portion of the golf ball, i.e., one of the core, cover(s), or optional intermediate layer(s), particularly the cover or optional intermediate layer, are formed of an aliphatic polyurethane and/or polyurea composition using the methods described herein.

The present invention particularly is related to a method of forming cosmetically defect-free golf balls and golf ball components, as well as other golf equipment and putter inserts, comprising polyurethane elastomers, polyurea elastomers, or blends thereof. In particular, the method is directed to molding aliphatic polyurethane elastomers and/or aliphatic polyurea elastomers to form the golf ball components and utilizes molding temperatures that are lower than conventional molding temperatures used for forming such golf ball components comprising aromatic polyurethane and aromatic polyurea elastomers, while maintaining the same target gel time to form the molded product. Preferred embodiments encompass of forming cosmetically defect-free cover layers and intermediate layers using the methods of the present invention.

Cosmetic defects include, but are not limited to, voids, blisters, streaks, uneven surfaces, trenches, sink marks. The methods of the present invention enable the formation of various golf ball components while avoiding substantially all cosmetic defects.

One embodiment relates to a method of forming a golf ball component comprising the steps of providing a golf ball precursor, wherein the golf ball precursor, mixing a polyurea or polyurethane prepolymer and at least one saturated curing agent to form a castable reactive liquid material, filling a first set of mold halves with a first amount of the material, lowering the golf ball precursor into the first set of mold halves after a first predetermined time, wherein the golf ball precursor is held by vacuum for a second predetermined time, and wherein the second predetermined time is sufficient for complete exothermic reaction of the first amount of material, releasing the golf ball precursor from the vacuum providing a partially covered golf ball precursor, filling a second set of mold halves with a second amount of the material, wherein the first and second amounts are substantially similar, and wherein an exothermic reaction of the second amount commences, and mating the second set of mold halves with the partially covered golf ball precursor after a third predetermined time, wherein the mold halves are mated for a fourth predetermined time that is sufficient for complete exothermic reaction of the second amount of material. Preferred golf ball components include a core layer, intermediate layer or a cover layer, more preferably an intermediate layer or cover layer.

As used herein, the term "golf ball precursor" includes a center and optionally one or more of a core layer, intermediate layer or cover layer. The golf ball precursor is lowered into castable reactive liquid material to form a golf ball component, such as a core layer, intermediate layer, or cover layer, that is concentrically formed on the golf ball precursor. For example, a golf ball precursor comprising a center can be lowered into castable reactive liquid material to form a cover layer, intermediate layer or core layer. In another example, a golf ball precursor comprising a center and intermediate layer can be lowered into castable reactive liquid material to form another intermediate layer or a cover layer. In yet another example, a golf ball precursor comprising a center, at least one intermediate layer, and at least one cover layer, can be lowered into polyurea or polyurethane liquid material to form a cover layer.

After the mold halves are mated for a fourth predetermined time and the golf ball component is formed, the golf ball component is subject to an optional predetermined delay time prior to post curing. The optional delay time is from about 60 seconds to about 6 hours, preferably from about 90 seconds to about 3 hours, more preferably from about 3 minutes to about 1 hour, even more preferably from about 5 minutes to 30 minutes hour, and most preferably from about 8 minutes to about 12 minutes. Without wishing to be bound by any theory, the delay time allows for continued curing of the castable reactive liquid material to achieve a cure state that avoids deformation or degradation of the golf ball component when subjected to post curing, particularly at elevated temperatures.

The golf ball precursor typically is at room temperature or preheated to a temperature of up to about 100° F., i.e., about 100° F. or below, and even to a temperature of up to about 120° F., prior to being lowered into the mold halves. In particular, the golf ball precursor temperature is between about 65° F. to about 120° F. In another embodiment, the golf ball precursor is between about 70° F. to about 95° F. In other embodiments, the golf ball precursor is between about 75° F. and 90° F., and even between about 80° F. and 85° F. Preferably, the golf ball precursor temperature is between about 90° F. and about 95° F. and most preferably 95° F. In other embodiments, the golf ball precursor is at a temperature of between about 100° F. to about 120° F., and even between about 110° F. to about 115° F.

All ranges disclosed herein include upper and lower limits that can be interchanged to form new ranges. Thus, for example, the golf ball precursor temperature may also be between about 65° F. to about 85° F., between about 85° F. to about 100° F., and even between about 70° F. to about 115° F. In addition, the exotherm of the reaction of the reactive castable liquid material, as well as the post curing, facilitate expansion of the golf ball precursor. This expansion allows the reactive castable liquid to more efficiently pack in a smaller volume within the mold cavity. The material around the expanded golf ball precursor push against the walls of the mold, thereby pressing out any cosmetic defects on the formed golf ball component, such as cover layer, intermediate layer or core layer. Without wishing to be bound to any theory, it is believed that the rate of golf ball precursor expansion plays an important role in the cosmetics of the ball. Especially preferred golf ball precursor temperatures include room temperature (i.e. about 60-75° F.), which allows the golf ball precursor to expand faster than preheated golf ball precursors when they are immersed in the castable reactive liquid material.

The golf ball precursor also may be cooled to temperatures as low as about 0° F. prior to being lowered into the mold halves. Preferably, the golf ball precursor is cooled to temperatures of between about 20° F. to about 65° F., more preferably from about 20° F. to about 50° F. and even more preferably from about 25° F. to about 40° F. Contact of the cooled golf ball precursor with the higher temperature reactive castable liquid material facilitates expansion of the golf ball precursor. Similar to the above-described core expansion of the room temperature or heated golf ball precursor, the expansion allows for the formation of cosmetically defect free golf ball components.

The polyurea or polyurethane prepolymer and at least one saturated curing agent is mixed to form a castable reactive liquid material and maintained at a temperature of between about 70° F. to about 175° F. and preferably from about 80° F. to about 140° F. prior to filling the mold halves. In other embodiments, the polyurea or polyurethane prepolymer and at the least one saturated curing agent is mixed to form a castable reactive liquid material and maintained at a temperature of between about 150° F. to about 170° F. Reaction between the prepolymer and saturated curing agent typically is exothermic, which tends to increase the temperature of the castable reactive liquid material. Thus, it may be necessary to control the temperature by cooling of the castable reactive liquid material to within a temperature range to obtain a desirable gel or cure time. Likewise, it may be necessary to control the temperature by heating the castable reactive liquid material to within a temperature range to obtain a desirable gel or cure time. One or more polyurea and/or polyurethane prepolymer may be included in the castable reactive liquid material and each individual component of the prepolymer mixture may be individually preheated prior to being mixed, or the castable reactive liquid material is preheated after the addition of each component. In preferred embodiments, the temperature of the prepolymer mixture is preheated to a temperature of between about 90° F. to about 135° F., between about 100° F. to about 130° F., and even between about 110° F. to about 120° F. In another preferred embodiment, the temperature of the prepolymer mixture is preheated to a temperature of between about 155° F. to about 165° F.

The first and second mold halves are each independently at room temperature or preheated to a temperature up to about 140° F. In particular, the temperature of each mold half is at a temperature of between about 65° F. to about 140° F. In one preferred embodiment, each mold half is at a temperature of between about 65° F. to about 125° F. More preferably, each mold half is at a temperature of between about 70° F. and 110° F. In another preferred embodiment, each mold half is at a temperature of between about 100° F. to about 140° F. In another embodiment, each mold half is at a temperature of between about 110° F. to about 125° F. As mentioned above, the limits of these temperature ranges may be interchanged to form new ranges.

The first predetermined time and third predetermined time each is selected to allow for sufficient gelling of the castable reactive liquid material. In one embodiment, the first predetermined time and third predetermined time are each independently between about 30 seconds to about 120 seconds. Preferably, the first predetermined time and the third predetermined time are each independently between about 40 seconds to about 100 seconds. In a preferred embodiment, the first predetermined time and third predetermined time are each independently between about 50 second to about 90 seconds. In a more preferred embodiment, the first predetermined time and third predetermined time are each independently between about 60 seconds and 80 seconds. Thus, in one example, a first mold is filled with the components of a prepolymer mixture, i.e., a polyurea or polyurethane prepolymer and at least one saturated curing agent, and allowed to reside in the first mold for about 60 to about 80 seconds before a golf ball precursor is lowered at a controlled speed into the gelling castable reactive liquid material.

A ball cup holds the golf ball precursor through reduced pressure (or partial vacuum). The second predetermined and fourth predetermined time are selected to allow for sufficient exothermic reaction of the castable reactive liquid material, i.e., sufficient for substantially curing the castable reactive liquid material. In one embodiment, the second predetermined and fourth predetermined time each is independently between about 3 seconds and about 30 seconds. In other embodiments, the second predetermined and fourth predetermined time are each independently between about 4 seconds and about 12 seconds, and even between about 5 seconds and about 10 seconds.

After the castable reactive liquid material is cured to form the golf ball component, it may be subject to post cure conditions to optimize physical properties of the cured material. Preferably, the cured castable reactive liquid material may subject to post cure conditions of room temperature for from about 20 minutes to about 24 hours, more preferably from about 1 hour to 12 hours and even more preferably from about 3 hours to about 8 hours. In another embodiment, the cured castable reactive liquid material may be subject to temperatures of from about 100° F. to about 180° F. for a time of from about 1 minutes to about 30 minutes, preferably from about 120° F. to about 150° F. for from about 5 minutes to about 20 minutes, more preferably from about 130° F. to about 140° F. for from about 8 minutes to about 15 minutes.

Saturated Polyurethanes and Saturated Polyureas

The saturated polyurethanes and saturated polyureas (i.e., aliphatic polyurethanes and aliphatic polyureas) utilized in the present invention are substantially free of aromatic groups or moieties, such as those described in copending U.S. patent application Ser. No. 10/228,311 and U.S. Pat. No. 6,528,578, the entirety of which is incorporated herein by reference. Saturated polyurethanes and saturated polyureas suitable for use in the invention are a product of a reaction between at least one saturated polyurethane prepolymer or at least one saturated polyurea prepolymer respectively and at least one saturated curing agent. The polyurethane prepolymer is a product formed by a reaction between at least one saturated polyol and at least one saturated polyisocyanate. The polyurea prepolymer is a product formed by a reaction between at least one saturated polyamine and at least one saturated polyisocyanate. As is well known in the art, a catalyst may be employed to modify the reaction between the curing agent and the isocyanate and polyol or polyamine.

The polyurethane elastomers that may be utilized in the methods of the present invention are aliphatic polyurethane elastomers formed by contacting or reacting at least one saturated polyisocyanate with at least one saturated polyol to form a polyurethane prepolymer and further crosslinking and/or chain extending by contacting the polyurethane prepolymer with at least one amine curing agent or hydroxy-terminated glycol.

The polyurea elastomers that may be utilized in the methods of the present invention are aliphatic polyurea elastomers formed by contacting or reacting at least one saturated polyisocyanate with a polyamine, preferably a long-chain polyamine, to form a polyurea prepolymer and further crosslinking and/or chain extending by contacting the polyurea prepolymer with at least one amine curing agent.

As used herein, "polyisocyanate" refers to isocyanate-functional materials having at least two isocyanate functionalities. Polyisocyanates include saturated polyisocyanates (or "non-olefinic polyisocyanates"). "Saturated polyisocyanates" refer to isocyanate-functional materials having at least two isocyanate functionalities, that exhibits a negative response to a classic bromine test for unsaturation, wherein dropwise addition of the polyisocyanate to an aqueous bromine solution does not cause rapid decolorization, after the isocyanate functionality has been reacted with trimethylamine and ethanol to render the isocyanate further unreactive. This saturation test applies to the other saturated compounds and reagents used herein.

Any saturated polyisocyanate available to one of ordinary skill in the art is suitable for use according to the invention, such as those disclosed in copending U.S. patent application Ser. No. 10/228,311 and U.S. Pat. Nos. 6,528,578 and 6,610,812, the entirety of which are incorporated herein by reference. Saturated isocyanates for use with the present invention include aliphatic, cycloaliphatic, araliphatic, derivatives thereof, and combinations of these compounds having two or more isocyanate (NCO) groups per molecule. The isocyanates may be organic, modified organic, organic polyisocyanate-terminated prepolymers, low free isocyanates, and mixtures thereof. The isocyanate-containing reactable component may also include any isocyanate-functional monomer, dimer, trimer, or multimeric adduct thereof, prepolymer, quasi-prepolymer, or mixtures thereof.

Suitable polyisocyanate-containing components include polyisocyanates having the generic structure: $(O\!\!=\!\!C\!\!=\!\!N)_n$—R—$(N\!\!=\!\!C\!\!=\!\!O)_{n'}$, where n and n' are each independently 1, 2 or 3, R is a substituted or unsubstituted cyclic, linear or branched saturated (i.e., aliphatic) hydrocarbon moiety containing from about 1 to about 20 carbon atoms, preferably from about 1 to about 12 carbons, more preferably from about 2 to about 6 carbons. The polyisocyanate may also contain one or more saturated cyclic groups. When multiple saturated cyclic groups are present, linear and/or branched hydrocarbons containing from about 1 to about 10 carbon atoms can be present as spacers between the saturated cyclic groups. In some cases, the saturated cyclic group(s) may be substituted at the 2-, 3-, and/or 4-positions. Substituted groups may include, but are not limited to, halogens, primary, secondary, or tertiary $C_1$-$C_{12}$ hydrocarbon groups, which groups may or may not be substituted with a halogen or additional hydrocarbon groups, or a mixture thereof.

The polyisocyanate may be selected from the group consisting of a diisocyanate, triisocyanates, tetraisocyanate, and combinations thereof. Preferably, the polyisocyanate is a saturated diisocyanate and selected from the group consisting of ethylene diisocyanate; propylene-1,2-diisocyanate; tetramethylene-1,2-diisocyanate; tetramethylene-1,3-diisocyanate; tetramethylene-1,4-diisocyanate; 1,6-hexamethylene-diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophoronediisocyanate (IPDI); isocyanurate of HDI; uretdione of HDI; biuret of HDI; triisocyanate of 2,2,4-trimethyl-1,6-hexane diisocyanate (TMDI); 4,4'-dicyclohexylmethane diisocyanate ($H_{12}$MDI); and mixtures thereof.

As described above, the polyurethane prepolymer used herein is formed by reacting a saturated polyisocyanate with a saturated polyol. As used herein, "polyol" refers to hydroxy-functional materials having at least two hydroxy functionalities. Polyols include saturated polyols (or "non-olefinic polyols").

Any saturated polyol available to one of ordinary skill in the art is suitable for use according to the invention. Suitable saturated polyols include, but are not limited to, polyether polyols, polycaprolactone polyols, polyester polyols, polycarbonate polyols, hydrocarbon polyols, and other aliphatic polyols, including mixtures thereof.

Suitable polyether polyols for reacting with polyisocyanate to form polyurethane prepolymers include, but are not limited to, polytetramethylene ether glycol (PTMEG); modified polytetramethylene ether glycol (PTG-L); poly(oxyethylene) glycol; poly(oxypropylene) glycol; poly(ethylene oxide capped oxypropylene) glycol; and mixtures thereof.

Saturated polycaprolactone polyols include, but not limited to, diethylene glycol initiated polycaprolactone; propylene glycol initiated polycaprolactone; 1,4-butanediol initiated polycaprolactone; trimethylol propane initiated polycaprolactone; neopentyl glycol initiated polycaprolactone; 1,6-hexanediol initiated polycaprolactone; polytetramethylene ether glycol (PTMEG) initiated polycaprolactone; and mixtures thereof.

Suitable saturated polyester polyols include, but not limited to, polyethylene adipate glycol; polyethylene propylene adipate glycol; polybutylene adipate glycol; polyethylene butylene adipate glycol; polyhexamethylene adipate glycol; polyhexamethylene butylene adipate glycol; and mixtures thereof.

Examples of polycarbonate polyols that may be used with the present invention include, but are not limited to, poly (hexamethylene carbonate) glycol, and mixtures thereof.

Hydrocarbon polyols include, but not limited to, hydroxy-terminated liquid isoprene rubber (LIR), hydroxy-terminated polybutadiene polyol, and mixtures thereof.

Other aliphatic polyols that may be used to form the prepolymer of the invention include, but not limited to, glycerols; castor oil and its derivatives; saturated hydroxy-terminated hydrocarbon polyols; saturated hydroxy-terminated polybutadiene; saturated hydroxy-terminated polyisoprene; Kraton polyols; acrylic polyols; acid functionalized polyols based on a carboxylic, sulfonic, or phosphoric acid group; dimer alcohols converted from the saturated dimerized fatty acid; and mixtures thereof.

As described above, the polyurea prepolymer used herein is formed by reacting a saturated polyisocyanate with a saturated polyamine. As used herein, "polyamine" refers to amine-functional materials having at least two amine functionalities. Polyamines include saturated polyamines (or "non-olefinic polyamines").

Any saturated polyamine available to one of ordinary skill in the art is suitable for use according to the invention. Suitable saturated polyamines include, but are not limited to, primary or secondary $C_1$-$C_{20}$ substituted and unsubstituted aliphatic and cycloaliphatic polyamines having preferably 2 to 6, especially 2 to 4, amino groups, such as primary or secondary polyether amines, primary or secondary amine-terminated polyamides; and primary or secondary amine-terminated polybutadiene. Other examples of saturated polyamines include diamines prepared from dibasic acids, dimerized fatty acids, and amine-terminated polybutadiene.

Any polyether amine available to one of ordinary skill in the art is suitable for use according to the invention. As used herein, "polyether amines" refer to at least polyoxyalkylene-amines containing primary amino groups attached to the terminus of a polyether backbone. Due to the rapid reaction of isocyanate and amine, and the insolubility of many urea products, however, the selection of diamines and polyether amines is limited to those allowing the successful formation of the polyurea prepolymers. In one embodiment, the polyether backbone is based on tetramethylene, propylene, ethylene, trimethylolpropane, glycerin, and mixtures thereof.

Suitable polyether amines include, but are not limited to, polytetramethylene ether diamines, polyoxypropylene diamines, poly(ethylene oxide capped oxypropylene) ether diamines, triethyleneglycoldiamines, propylene oxide-based triamines, trimethylolpropane-based triamines, glycerin-based triamines, and mixtures thereof. In one embodiment, the polyether amine used to form the prepolymer is Jeffamine D2000 (manufactured by Huntsman Corporation of Austin, Tex.).

The molecular weight of the polyether amine for use in the invention may range from about 100 to about 5000. As used herein, the term "about" is used in connection with one or more numbers or numerical ranges, should be understood to refer to all such numbers, including all numbers in a range. In one embodiment, the polyether amine molecular weight is about 230 or greater. In another embodiment, the molecular weight of the polyether amine is about 4000 or less. In yet another embodiment, the molecular weight of the polyether amine is about 600 or greater. In still another embodiment, the molecular weight of the polyether amine is about 3000 or less. In yet another embodiment, the molecular weight of the polyether amine is between about 1000 and about 3000, and more preferably is between about 1500 to about 2500. Because lower molecular weight polyether amines may be prone to forming solid polyureas, a higher molecular weight oligomer, such as Jeffamine D2000, is preferred.

In one embodiment, the polyether amine has the generic structure:

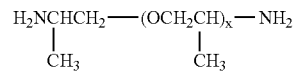

wherein the repeating unit x has a value ranging from about 1 to about 70. Even more preferably, the repeating unit may be from about 5 to about 50, and even more preferably is from about 12 to about 35.

In another embodiment, the polyether amine has the generic structure:

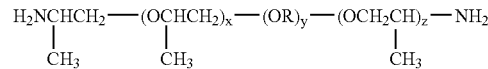

wherein the repeating units x and z have combined values from about 3.6 to about 8 and the repeating unit y has a value ranging from about 9 to about 50, and wherein R is —$(CH_2)_a$—, where "a" may be a repeating unit ranging from about 1 to about 10.

In yet another embodiment, the polyether amine has the generic structure:

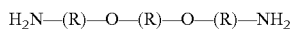

wherein R is —$(CH_2)_a$—, and "a" may be a repeating unit ranging from about 1 to about 10.

Many amines may be unsuitable for reaction with the isocyanate because of the rapid reaction between the two components. In particular, shorter chain amines are fast reacting. In one embodiment, however, a hindered secondary diamine may be suitable for use in the prepolymer. Without being bound to any particular theory, it is believed that an amine with a high level of stearic hindrance, e.g., a secondary butyl group on the nitrogen atom, has a slower reaction rate than an amine with no hindrance or a low level of hindrance. For example, 4,4'-bis-(sec-butylamino)-dicyclohexylmethane (Clearlink 1000) and other similar hindered secondary diamine known to one of ordinary skill in the art may be suitable for use in combination with an isocyanate to form the polyurea prepolymer.

The number of unreacted NCO groups in the polyurea prepolymer of isocyanate and polyether amine may be varied to control such factors as the speed of the reaction, the resultant hardness of the composition, and the like. For instance, the number of unreacted NCO groups in the polyurea prepolymer of isocyanate and polyether amine may be less than about 14 percent. In one embodiment, the polyurea prepolymer has from about 2.5 percent to about 14 percent unreacted NCO groups, and even more preferably has from about 5 to about 11 percent unreacted NCO groups. In one embodiment, the percentage of unreacted NCO groups is about 6 percent to about 9 percent. Alternatively, the percentage of unreacted NCO groups may be about 9.0 percent or less, and more preferably, about 8.5 percent or less. In another embodiment, the unreacted NCO content is from about 2.5 percent to about 7.5 percent, and more preferably from about 4 percent to about 6.5 percent.

The polyurethane and polyurea each can be formed by crosslinking the polyurethane prepolymer and polyurea prepolymer respectively with a blend or mixture of saturated curing agents. Curatives for use with the present invention include, but are not limited to, hydroxy terminated curing agents, amine-terminated curing agents, and mixtures thereof. In one preferred embodiment, the saturated curing agents are amine-terminated curing agents, and more preferably secondary diamine curing agents. If desired, however, the polyurea composition may be formed with a single saturated curing agent. Polyurethane prepolymers and polyurea prepolymers cured with a secondary diamine with 1:1 stoichiometry in the absence of moisture are thermoplastic in nature, while thermoset polyurethane and polyurea compositions, on the other hand, are generally produced from a polyurethane prepolymer and polyurea prepolymer respectively cured with a primary diamine or polyfunctional glycol.

Suitable hydroxy-terminated curing agents include, but are not limited to, ethylene glycol; diethylene glycol; polyethylene glycol; propylene glycol; 2-methyl-1,3-propanediol; 2,-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; tetra-(2-hydroxypropyl)-ethylene diamine; diethylene glycol di-(aminopropyl)ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy)ethoxy]cyclohexane; 1,3-bis-{2-[2-(2-hydroxyethoxy)ethoxy]ethoxy}cyclohexane; trimethylolpropane; polytetramethylene ether glycol; and mixtures thereof.

In one embodiment, the hydroxy-terminated curing agent has a molecular weight of at least about 50. In another embodiment, the molecular weight of the hydroxy-terminated curing agent is about 2000 or less. In yet another embodiment, the hydroxy-terminated curing agent is polytetramethylene ether glycol, which preferably has a molecular weight ranging from about 250 to about 3900. It should be understood that molecular weight, as used herein, is the absolute weight average molecular weight and would be understood as such by one of ordinary skill in the art.

Suitable amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol di-(aminopropyl) ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imido-bis-propylamine; monoethanolamine, diethanolamine; triethanolamine; monoisopropanolamine, diisopropanolamine; isophoronediamine; 3,3'-dimethyl-4,4'-bis-(sec-butylamino)-dicyclohexylmethane; N,N'-diisopropyl-isophorone diamine; 3-{[(5-amino-1,3,3-trimethylcyclohexyl)methyl]amino}-propanenitrile and mixtures thereof. In one embodiment, the amine-terminated curing agent is 4,4'-bis-(sec-butylamino)-dicyclohexylmethane. In one embodiment, the amine-terminated curing agent has a molecular weight of about 64 or greater. In another embodiment, the molecular weight of the amine-curing agent is about 2000 or less.

Skilled artisans are aware that the various properties of the golf ball and golf ball components, e.g., hardness, may be controlled by adjusting the weight ratio of polyurethane prepolymer or polyurea prepolymer to saturated curing agent, which is a function of the NCO content of the respective prepolymer and molecular weight of the saturated curing agent. For example, the weight ratio of a polyurea prepolymer with 6 percent unreacted NCO groups cured with 1,4-butanediol is 15.6:1, whereas the weight ratio of the same prepolymer cured with 4,4'-bis-(sec-butylamino)-dicyclohexylmethane (Clearlink 1000) is 4.36:1. The weight ratio of prepolymer to saturated curing agent for the purposes of this invention is preferably from about 0.5:1 to about 16:1.

A catalyst may be employed to modify the reaction between the saturated curing agent and the prepolymer. Suitable catalysts include, but are not limited to bismuth catalyst, zinc octoate, tin catalysts such as di-butyltin dilaurate (DABCO®-T12 manufactured by Air Products and Chemicals, Inc.); di-butyltin diacetate (DABCO®-T1); tin (II) chloride; tin (IV) chloride; di-butyltin dimethoxide (FASCAT®-4211); dimethyl-bis[1-oxonedecyl)oxy] stannane (FORMEZ® UL-28); di-n-octyltin bis-isooctyl mercaptoacetate (FORMEZ® UL-29); amine catalysts such as triethylenediamine (DABCO®-33LV), triethylamine, and tributylamine; organic acids such as oleic acid and acetic acid; delayed catalysts such as POLYCAT™ SA-1, POLYCAT™ SA-2, POLYCAT™, and the like; and mixtures thereof. In one embodiment, the catalyst is di-butyltin dilaurate.

The catalyst is preferably added in an amount sufficient to modify the reaction of the components in the reactive mixture. For example, polyurethane systems generally benefit from the use of an organotin catalyst because the catalyst activates an alcohol by forming a tin alkoxide and then coordinates with the isocyanate to enhance the reaction rate. In contrast, straight polyurea systems are generally very fast reacting and do not require a catalyst. However, the use of certain catalyst compounds has been found to inhibit the reaction rate in cycloaliphatic-based polyurea systems. Without being bound by any particular theory, an organotin compound, such as di-butyltin dilaurate, can be used to slow down the reaction rate of cycloaliphatic-based polyisocyanate polyurea systems cured with an amine-terminated curing agent.

In one embodiment, the catalyst is present in an amount from about 0.001 percent to about 5 percent by weight of the castable reactive liquid material. For example, when using a tin catalyst, such as di-butyltin dilaurate, the catalyst is preferably present in an amount from about 0.005 percent to about 1 percent. In another embodiment, the catalyst is present in an amount of about 0.05 weight percent or greater. In another embodiment, the catalyst is present in an amount of about 0.5 weight percent or greater.

When using a catalyst to slow down the reaction rate of a polyurea system, the amount of catalyst may be from about 0.05 weight percent to about 0.4 weight percent. For example, a catalyst in the amount of about 0.05 to about 0.25 weight percent is preferred to slow down the reaction rate by about 15 percent or greater. In one embodiment, about 0.1 to about 0.2 weight percent is used in the polyurea system to slow down the reaction rate by about 25 percent to about 40 percent.

Use of low levels of tin catalysts, typically from about 0 to about 0.04 weight percent of the total castable reactive liquid material, requires high temperatures to achieve a suitable reaction rate, which may result in degradation of the polyurethane prepolymer or polyurea prepolymer. Increasing the amount of catalysts to unconventional high levels enables the reduction in process temperatures while retaining comparable cure stages. Use of the higher catalyst level also allows the mixing speeds to be reduced. Thus, in one embodiment, the tin catalyst is present in an amount from about 0.010 percent or greater. For example, the tin catalyst may be present in an amount of about 0.01 percent to about 0.55 percent by weight of the composition. In another embodiment, the tin catalyst may be present in an amount of about 0.05 percent or greater by weight of the composition, e.g., about 0.05 percent to about 0.4 percent of tin catalyst is present in the composition. In yet another embodiment, the tin catalyst is present in an amount from about 0.1 percent to about 0.25 percent by weight of the composition. In still another embodiment, the tin catalyst is present in an amount of about 0.05 percent to about 0.15 percent by weight of the composition.

Composition Blends

As discussed, aliphatic polyurethane prepolymers are produced by combining at least one aliphatic polyol and at least one polyisocyanate. Likewise, polyurea prepolymers are produced by combining at least one aliphatic polyamine and at least one polyisocyanate. Castable thermosetting polyurethanes are obtained by curing at least one polyurethane prepolymer with a saturated curing agent selected from a primary diamine, triol or tetraol. Castable thermoplastic polyurethanes are obtained by curing at least one polyurethane prepolymer with a diol or secondary diamine curing agent at 1:0.8 to 1:1.2 stoichiometry.

Likewise, polyurea prepolymers are produced by combining at least one aliphatic polyamine and at least one polyisocyanate. Castable thermosetting polyureas are obtained by curing at least one polyurea prepolymer with a saturated curing agent selected from a primary diamine. Castable thermoplastic polyureas are obtained by curing at least one polyurea prepolymer with a secondary diamine curing agent at 1:0.8 to a 1:1.2 stoichiometry.

It is well known in the art that if the saturated polyurethane or polyurea materials are to be blended with other thermoplastics, care must be taken in the formulation process so as to produce an end product that is thermoplastic in nature. Preferably, the cover and/or intermediate layer compositions include from about 1 percent to about 100 percent of saturated polyurethane, polyurea, or a mixture thereof. In one embodiment, the cover composition and/or the intermediate layer composition includes about 10 percent to about 75 percent saturated polyurethane, polyurea or a mixture thereof. The saturated polyurethane and/or saturated polyurea composition may be a blend, such that about 90 percent to about 10 percent, more preferably from about 90 percent to about 25 percent of the cover and/or the intermediate layer composition includes one or more other polymers and/or other materials as described below.

Such polymers include, but are not limited to polyurethane/polyurea ionomers, polyurethanes or polyureas, epoxy resins, polyethylenes, polyamides and polyesters, polycarbonates, polyacrylin, and mixtures thereof. Unless otherwise stated herein, all percentages are given in percent by weight of the total composition of the golf ball layer in question. For example, the cover and/or intermediate layer may be formed from a blend of at least one saturated polyurethane and at least one thermoplastic or thermoset, ionic or non-ionic, polyurethane or polyurea, cationic urethane ionomers and urethane epoxies, and blends thereof. Examples of suitable urethane ionomers are disclosed in U.S. Pat. No. 5,692,974, the disclosure of which is hereby incorporated by reference in its entirety. Other examples of suitable polyurethanes are described in U.S. Pat. No. 5,334,673, the entire disclosure of which is incorporated by reference herein. Examples of appropriate polyureas are discussed in U.S. Pat. No. 5,484,870 and examples of suitable polyurethanes cured with epoxy group containing curing agents are disclosed in U.S. Pat. No. 5,908,358, the disclosures of which are hereby incorporated herein by reference in their entirety.

A variety of conventional components can be added to the cover compositions of the present invention. These include, but are not limited to, white pigment such as $TiO_2$, ZnO, optical brighteners, surfactants, processing aids, foaming agents, UV stabilizers, and light stabilizers. Saturated polyurethanes are resistant to discoloration. However, they are not immune to deterioration in their mechanical properties upon weathering. Addition of UV absorbers and light stabilizers to any of the above compositions and, in particular, the polyurethane compositions, help to maintain the tensile strength, elongation, and color stability. Suitable UV absorbers and light stabilizers include TINUVIN® 328, TINUVIN® 213, TINUVIN® 765, TINUVIN® 770 and TINUVIN® 622. The preferred UV absorber is TINUVIN® 328, and the preferred light stabilizer is TINUVIN® 765. TINUVIN® products are available from Ciba-Geigy. Dyes, as well as optical brighteners and fluorescent pigments may also be included in the golf ball covers produced with polymers formed according to the present invention. Such additional ingredients may be added in any amounts that will achieve their desired purpose.

Other conventional ingredients, e.g., density-controlling fillers, ceramics, and glass spheres are well known to the person of ordinary skill in the art and may be included in cover and intermediate layer blends of the present invention in amounts effective to achieve their known purpose. Thus, an optional filler component may be chosen to impart additional density to the compositions of the invention. The selection of such filler(s) is dependent upon the type of golf ball desired, i.e., one-piece, two-piece, multi-component, or wound, as will be more fully detailed below. Generally, the filler will be inorganic, having a density of greater than 2 g/cc, and will be present in amounts between about 5 and about 65 weight percent based on the total weight of the polymer components included in the layer(s) in question. Examples of useful fillers include zinc oxide, barium sulfate, calcium oxide, calcium carbonate, and silica, as well as other known corresponding salts and oxides thereof.

Golf Ball Formation

Core

As used herein, the term "core" means the innermost portion of a golf ball, and may include one or more layers. When a multi-layer core is contemplated, the core is the innermost component with one or more additional core layers disposed thereon. At least a portion of the core, typically the center, is solid, semi-solid, hollow, powder-filled or fluid-filled. As used herein, the term "fluid" means a gas, liquid, gel, paste, or the like, or a combination thereof. The term "inner core" may be used interchangeably with "center" or "golf ball center," while the term "outer core" may be used interchangeably with "intermediate layer" or "at least one intermediate layer." For example, one optional type of intermediate layer is a tensioned elastomeric material wound about the center. When a tensioned elastomeric material is included as an intermediate layer, the compositions of the invention are preferably incorporated into the elastomeric material, the center, or both. An intermediate layer may be included within a ball having, for example, a single layer or multilayer cover, a single layer or multilayer core, both a single layer cover and core, or both a multilayer cover and a multilayer core. Intermediate layers of the type described above are sometimes referred to in the art, and, thus, herein as well, as an inner cover layer, as an outer core layer, or as a mantle layer.

Golf balls having a one-piece core or any portion of a multi-layer core may be formed from any core material suitable for use in golf balls that is known to one of ordinary skill in the art, as discussed below. Suitable core materials include thermoset materials, such as rubber, styrene butadiene, polybutadiene, including cis-polybutadiene, trans-polybutadiene, and blends thereof, as well as cis-to-trans converted polybutadiene, isoprene, polyisoprene, trans-isoprene, as well as thermoplastics, such as ionomer resins, polyamides or polyesters, and thermoplastic and thermoset polyurethane elastomers, and any mixture thereof. In addition, suitable core materials include polyurea compositions, as well as other conventional materials, such as compositions including a base rubber, a crosslinking agent, and a density adjusting filler. The base rubber may include natural or synthetic rubbers, as well as any combination thereof. In one embodiment, the base rubber is 1,4-polybutadiene having a cis-structure of at least about 40 percent, of which natural rubber, polyisoprene rubber and/or styrene-butadiene rubber may be added thereto. The core may also include one or more cis-to-trans catalyst and a free radical source, as well as a cis-to-trans catalyst accelerator and crosslinking agent, as described in copending U.S. application Ser. Nos. 10/437,386 and 10/437,387, the entirety of which are incorporated herein by reference.

The core may also include a filler. Fillers added to one or more portions of the golf ball typically include processing aids or compounds to affect rheological and mixing properties, the specific gravity (i.e., density-modifying fillers), the modulus, the tear strength, reinforcement, and the like. The fillers are generally inorganic, and suitable fillers include numerous metals (including metal powders) or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Foamed polymer blends may be formed by blending ceramic or glass microspheres with polymer material. Polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

Additional materials conventionally included in golf ball compositions include, but are not limited to, density-adjusting fillers, coloring agents, reaction enhancers, whitening agents, UV absorbers, hindered amine light stabilizers, defoaming agents, processing aids, and other conventional additives. Stabilizers, softening agents, plasticizers, including internal and external plasticizers, impact modifiers, foaming agents, excipients, reinforcing materials and compatibilizers can also be added to any composition of the invention. All of these materials, which are well known in the art, are added for their usual purpose in typical amounts.

For example, the fillers discussed above may be added to the conventional materials to affect rheological and mixing properties, the specific gravity (i.e., density-modifying fillers), the modulus, the tear strength, reinforcement, and the like. Fillers may also be used to modify the weight of the core, e.g., a lower weight ball is preferred for a player having a low swing speed.

The golf ball components may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. A method of flip molding can be found, for example, in U.S. Pat. No. 6,096,255. A method of injection molding using a split vent pin can be found in co-pending U.S. patent application Ser. No. 09/742,435, filed Dec. 22, 2000, entitled "Split Vent Pin for Injection Molding." Examples of retractable pin injection molding may be found in U.S. Pat. Nos. 6,129,881, 6,235,230, and 6,379,138. A method of molding components for multi-layer core golf balls may be found in, for example, U.S. Pat. No. 6,290,797. Each of these molding references are incorporated in their entirety by reference herein. In addition, a chilled chamber, i.e., a cooling jacket, such as the one disclosed in U.S. patent application Ser. No. 09/717,136, filed Nov. 22, 2000, entitled "Method of Making Golf Balls" may be used to cool the compositions of the invention when casting, which also allows for a higher loading of catalyst into the system.

Conventionally, compression molding and injection molding are applied to thermoplastic materials, whereas RIM, liquid injection molding, and casting are employed on thermoset materials. These and other manufacture methods are disclosed in U.S. Pat. Nos. 6,207,784, 5,334,673, 5,484,870, and 5,733,428, the disclosures of which are incorporated herein by reference in their entirety.

The cores of the invention may be formed by any suitable method known to one of ordinary skill in art. When the cores are formed from a thermoset material, compression molded is a particularly suitable method of forming the core. In a thermoplastic core embodiment, on the other hand, the cores may be injection molded.

Suitable methods include single pass mixing (ingredients are added sequentially), multi-pass mixing, and the like. The crosslinking agent, and any other optional additives used to modify the characteristics of the golf ball center or additional layer(s), may similarly be combined by any type of mixing. Suitable mixing equipment is well known to one of ordinary skill in the art, and such equipment may include a Banbury mixer, a two-roll mill, or a twin screw extruder. Suitable mixing speeds and temperatures are well-known to one of ordinary skill in the art, or may be readily determined without undue experimentation.

The mixture can be subjected to, e.g., a compression or injection molding process, and the molding cycle may have a single step of molding the mixture at a single temperature for a fixed-time duration. In one embodiment, a single-step cure cycle is employed. Although the curing time depends on the various materials selected, a suitable curing time is about 5 minutes to about 18 minutes, preferably from about 8 minutes to about 15 minutes, and more preferably from about 10 minutes to about 12 minutes. An example of a single step molding cycle, for a mixture that contains dicumyl peroxide, would hold the polymer mixture at 171° C. (340° F.) for a duration of 15 minutes. An example of a two-step molding cycle would be holding the mold at 143° C. (290° F.) for 40 minutes, then ramping the mold to 171° C. (340° F.) where it is held for a duration of 20 minutes. One of ordinary skill in the art will be readily able to adjust the curing time based on the particular materials used and the discussion herein.

Furthermore, U.S. Pat. Nos. 6,180,040 and 6,180,722 disclose methods of preparing dual core golf balls. The entire disclosures of these patents are hereby incorporated by reference herein.

Intermediate Layer

An "intermediate layer" (also known as inner layer or mantle layer) is defined herein as a portion of the golf ball that occupies a volume between the cover and the core. Such an intermediate layer may be distinguished from a cover or a core by some difference between the golf ball layers, e.g., hardness, compression, thickness, and the like. An intermediate layer may be used, if desired, with a multilayer cover or a multilayer core, or with both a multilayer cover and a multilayer core. Accordingly, an intermediate layer is also sometimes referred to in the art as an inner cover layer, as an outer core layer or as a mantle layer, i.e., any layer(s) disposed between the inner core and the outer cover of a golf ball, this layer may be incorporated, for example, with a single layer or a multilayer cover, with a one-piece core or a multilayer core, with both a single layer cover and core, or with both a multilayer cover and a multilayer core. As with the core, the intermediate layer may also include a plurality of layers. It will be appreciated that any number or type of intermediate layers may be used, as desired.

The intermediate layer may be composed of the castable reactive liquid materials and formed using the methods described herein. When an intermediate layer is not comprised of the castable reactive liquid materials, it is composed conventional materials known to one of ordinary skill in the art may be used, including thermoplastic and thermosetting materials as discussed below.

The conventional intermediate layer can include any materials known to one of ordinary skill in the art including thermoplastic and thermosetting materials. For example, the intermediate layer may also likewise include one or more homopolymeric or copolymeric materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, dimerized fatty acids, as well as those from amino acids such as poly(caprolactam), and blends of polyamides with SURLYN, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX, sold by Atofina Chemicals, Inc. of King of Prussia, Pa.;

(8) Polyphenylene oxide resins or blends of polyphenylene oxide with high impact polystyrene as sold under the trademark NORYL by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL by E.I. DuPont de Nemours & Co. of Wilmington, Del., and LOMOD by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

The intermediate layer also may include ionomeric materials, such as ionic copolymers of ethylene and an unsaturated monocarboxylic acid, which are available under the trademark SURLYN® of E.I. DuPont de Nemours & Co., of Wilmington, Del., or IOTEK® or ESCOR® of Exxon. These are copolymers or terpolymers of ethylene and methacrylic acid or acrylic acid totally or partially neutralized, i.e., from about 1 to about 100 percent, with salts of zinc, sodium, lithium, magnesium, potassium, calcium, manganese, nickel or the like. The carboxylic acid groups may also include methacrylic, crotonic, maleic, fumaric or itaconic acid. The salts are the reaction product of an olefin having from 2 to 10 carbon atoms and an unsaturated monocarboxylic acid having 3 to 8 carbon atoms.

The intermediate layer may also include at least one ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent.

The ionomer also may include so-called "low acid" and "high acid" ionomers, as well as blends thereof. In general, ionic copolymers including up to about 15 percent acid are considered "low acid" ionomers, while those including greater than about 15 percent acid are considered "high acid" ionomers.

Thermoplastic polymer components, such as copolyetheresters (e.g., HYTREL®, available from DuPont), copolyesteresters, copolyetheramides (e.g., PEBAX®, available from Atofina Chemicals, Inc.) elastomeric polyolefins, styrene diene block copolymers and their hydrogenated derivatives (e.g. block copolymers of styrene-butadiene-styrene, styrene-(ethylene-propylene)-styrene or styrene-(ethylene-butylene)-styrene, as well as KRATON D®, KRATON G®, KRATON FG® from Shell Chemical), copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized, thermoplastic polyurethanes. Examples of these materials are disclosed in U.S. Patent Application Publication Nos. 2001/0018375 and 2001/0019971, which are incorporated herein by reference in their entirety.

The ionomer compositions may also include at least one grafted metallocene catalyzed polymer. Blends of this embodiment may include about 1 pph to about 100 pph of at least one grafted metallocene catalyzed polymer and about 99 pph to 0 pph of at least one ionomer. Where the layer is foamed, the grafted metallocene catalyzed polymer blends may be foamed during molding by any conventional foaming or blowing agent. In addition, polyamides may also be blended with ionomers.

The intermediate layer may also include at least one primarily-or fully non-ionomeric thermoplastic material. Suitable non-ionomeric materials include polyamides and polyamide blends, grafted and non-grafted metallocene catalyzed polyolefins or polyamides, polyamide/ionomer blends, polyamide/nonionomer blends, polyphenylene ether/ionomer blends, and mixtures thereof. Examples of grafted and non-grafted metallocene catalyzed polyolefins or polyamides, polyamide/ionomer blends, polyamide/nonionomer blends are disclosed in co-pending U.S. patent application Ser. No. 10/138,304, filed May 6, 2002, entitled "Golf Ball Incorporating Grafted Metallocene Catalyzed Polymer Blends," the entire disclosure of which is incorporated by reference herein.

Polyamide homopolymers, such as polyamide 6,18 and polyamide 6,36 may be used alone, or in combination with other polyamide homopolymers. In another embodiment, polyamide copolymers, such as polyamide 6,10/6,36, are used alone, or in combination with other polyamide homopolymers or copolymers. Other examples of suitable polyamide homopolymers and copolymers include polyamide, polyamide 4, polyamide 6, polyamide 7, polyamide 11, polyamide 12 (manufactured as Rilsan AMNO by Atofina Chemicals, Inc. of King of Prussia, Pa.), polyamide 13, polyamide 4,6, polyamide 6,6, polyamide 6,9, polyamide 6,10, polyamide 6,12, polyamide 6,36, polyamide 12,12, polyamide 13,13, polyamide 6/6,6, polyamide 6,6/6,10, polyamide 6/6, T wherein T represents terephthalic acid, polyamide 6/6, 6/6,10, polyamide 6,10/6,36, polyamide 66,6,18, polyamide 66,6,36, polyamide 6/6,18, polyamide 6/6,36, polyamide 6/6, 10/6,18, polyamide 6/6,10/6,36, polyamide 6,10/6,18, polyamide 6,12/6,18, polyamide 6,12/6,36, polyamide 6/66/6,18, polyamide 6/66/6,36, polyamide 66/6,10/6,18, polyamide 66/6,10/6,36, polyamide 6/6,12/6,18, polyamide 6/6,12/6,36, and mixtures thereof.

Nonionomers suitable for blending with the polyamide include, but are not limited to, block copoly(ester) copolymers, block copoly(amide) copolymers, block copoly(urethane) copolymers, styrene-based block copolymers, thermoplastic and elastomer blends wherein the elastomer is not vulcanized (TEB), and thermoplastic and elastomer or rubber blends wherein the elastomer is dynamically vulcanized (TED). Other nonionomers suitable for blending with polyamide to form an intermediate layer composition include, but are not limited to, polycarbonate, polyphenylene oxide, imidized, amino group containing polymers, high impact polystyrene (HIPS), polyether ketone, polysulfone, poly(phenylene sulfide), reinforced engineering plastics, acrylic-styrene-acrylonitrile, poly(tetrafluoroethylene), poly(butyl acrylate), poly(4-cyanobutyl acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(4-dodecylstyrene), poly(4-tetradecylstyrene), poly(ethylene oxide), poly (oxymethylene), poly(silazane), poly(furan tetracarboxylic acid diimide), poly(acrylonitrile), poly(methylstyrene), as well as the classes of polymers to which they belong and their copolymers, including functional comonomers, and blends thereof.

The intermediate layer may include a resilient polymer component, which is preferably used as the majority polymer in the intermediate layer to impart resilience in the cured state, and a reinforcing polymer component as a blend.

Resilient polymers suitable for use in the intermediate layer include polybutadiene, polyisoprene, styrene-butadiene, styrene-propylene-diene rubber, ethylene-propylene-diene (EPDM), mixtures thereof, and the like, preferably having a high molecular weight of at least about 50,000 to about 1,000,000.

The reinforcing polymer component preferably has a glass transition temperature ($T_G$) sufficiently low to permit mixing without initiating crosslinking, preferably between about 35° C. to 120° C. In addition, the reinforcing polymer component preferably has a sufficiently low viscosity at the mixing temperature when mixed with the resilient polymer component to permit proper mixing of the two polymer components. The weight of the reinforcing polymer relative to the total composition for forming the intermediate layer generally ranges from about 5 to 25 weight percent, preferably about 10 to 20 weight percent.

Examples of polymers suitable for use in the reinforcing polymer component include: trans-polyisoprene, block copolymer ether/ester, acrylic polyol, polyethylene, polyethylene copolymer, 1,2-polybutadiene (syndiotactic), ethylene-vinyl acetate copolymer, trans-polycyclooctenenamer, trans-isomer polybutadiene, and mixtures thereof. Particularly suitable reinforcing polymers include: HYTREL 3078, a block copolymer ether/ester commercially available from DuPont of Wilmington, Del.; a trans-isomer polybutadiene, such as FUREN 88 obtained from Asahi Chemicals of Yako, Kawasakiku, Kawasakishi, Japan; KURRARAY TP251, a trans-polyisoprene commercially available from KURRARAY CO.; LEVAPREN 700HV, an ethylene-vinyl acetate copolymer commercially available from Bayer-Rubber Division, Akron, Ohio; and VESTENAMER 8012, a trans-polycyclooctenenamer commercially available from Huls America Inc. of Tallmadge, Ohio. Some suitable reinforcing polymer components are listed in Table 1 below with their crystalline melt temperature ($T_C$) and/or $T_G$.

Another polymer particularly suitable for use in the reinforcing polymer component is a rigidifying polybutadiene component, which typically includes at least about 80 percent trans-isomer content with the remainder being cis-isomer 1,4-polybutadiene and vinyl-isomer 1,2-polybutadiene. Thus, it may be referred to herein as a "high trans-isomer polybutadiene" or a "rigidifying polybutadiene" to distinguish it from the cis-isomer polybutadienes or polybutadienes having a low trans-isomer content, i.e., typically below 80 percent, used to form the golf ball cores of the invention. The vinyl-content of the rigidifying polybutadiene component is preferably present in no more than about 15 percent, preferably less than about 10 percent, more preferably less than about 5 percent, and most preferably less than about 3 percent of the polybutadiene isomers.

The rigidifying polybutadiene component, when used in a golf ball of the invention, preferably has a polydispersity of no greater than about 4, preferably no greater than about 3, and more preferably no greater than about 2.5. The polydispersity, or PDI, is a ratio of the molecular weight average ($M_w$) over the molecular number average ($M_n$) of a polymer.

In addition, the rigidifying polybutadiene component, when used in a golf ball of the invention, typically has a high absolute molecular weight average, defined as being at least about 100,000, preferably from about 200,000 to about 1,000, 000. In one embodiment, the absolute molecular weight average is from about 230,000 to about 750,000. In another embodiment, the molecular weight is about 275,000 to about 700,000. In any embodiment where the vinyl-content is present in greater than about 10 percent, the absolute molecular weight average is preferably greater than about 200,000.

When trans-polyisoprene or high trans-isomer polybutadiene is included in the reinforcing polymer component, it may be present in an amount of about 10 to about 40 weight percent, preferably about 15 to about 30 weight percent, more preferably about 15 to no more than about 25 weight percent of the polymer blend, i.e., the resilient and reinforcing polymer components.

The same crosslinking agents mentioned above with regard to the core may be used in this embodiment to achieve the desired elastic modulus for the resilient polymer-reinforcing polymer blend. In one embodiment, the crosslinking agent is added in an amount from about 1 to about 50 pph of the polymer blend, preferably about 20 to about 45 pph, and more preferably about 30 to about 40 pph, of the polymer blend.

The resilient polymer component, reinforcing polymer component, free-radical initiator, and any other materials used in forming an intermediate layer of a golf ball core in accordance with invention may be combined by any type of mixing known to one of ordinary skill in the art.

The intermediate layer may also be a tensioned elastomeric material wound around a solid, semi-solid, hollow, fluid-filled, or powder-filled center. A wound layer may be described as a core layer or an intermediate layer for the purposes of the invention. As an example, the golf ball may include a core layer, a tensioned elastomeric layer wound thereon, and a cover layer. The tensioned elastomeric material may be formed of any suitable material known to one of ordinary skill in the art.

In one embodiment, the tensioned elastomeric layer is a high tensile filament having a tensile modulus of about 10,000 kpsi or greater, as disclosed in co-pending U.S. patent application Ser. No. 09/842,829, filed Apr. 27, 2001, entitled "All Rubber Golf Ball with Hoop-Stress Layer," the entire disclosure of which is incorporated by reference herein. In another embodiment, the tensioned elastomeric layer is coated with a binding material that will adhere to the core and itself when activated, causing the strands of the tensioned elastomeric layer to swell and increase the cross-sectional area of the layer by at least about 5 percent. An example of such a golf ball construction is provided in co-pending U.S. patent application Ser. No. 09/841,910, the entire disclosure of which is incorporated by reference herein.

The intermediate layer may also be formed of a binding material and an interstitial material distributed in the binding material, wherein the effective material properties of the intermediate layer are uniquely different for applied forces normal to the surface of the ball from applied forces tangential to the surface of the ball. Examples of this type of intermediate layer are disclosed in U.S. patent application Ser. No. 10/028,826, filed Dec. 28, 2001, entitled, "Golf Ball with a Radially Oriented Transversely Isotropic Layer and Manufacture of Same," the entire disclosure of which is incorporated by reference herein. In one embodiment of the present invention, the interstitial material may extend from the intermediate layer into the core. In an alternative embodiment, the interstitial material can also be embedded in the cover, or be in contact with the inner surface of the cover, or be embedded only in the cover.

At least one intermediate layer may also be a moisture barrier layer, such as the ones described in U.S. Pat. No. 5,820,488, which is incorporated by reference herein. Any suitable film-forming material having a lower water vapor transmission rate than the other layers between the core and the outer surface of the ball, i.e., cover, primer, and clear coat. Examples include, but are not limited to polyvinylidene chloride, vermiculite, and a reaction product with fluorine gas. In one embodiment, the moisture barrier layer has a water vapor transmission rate that is sufficiently low to reduce the loss of CoR of the golf ball by at least 5 percent if the ball is stored at 100° F. and 70 percent relative humidity for six weeks as compared to the loss in CoR of a golf ball that does not include the moisture barrier, has the same type of core and cover, and is stored under substantially identical conditions.

Additional materials may be included in the intermediate layer compositions outlined above. For example, catalysts, coloring agents, optical brighteners, crosslinking agents, whitening agents such as $TiO_2$ and ZnO, UV absorbers, hindered amine light stabilizers, defoaming agents, processing aids, surfactants, and other conventional additives may be added to the intermediates. In addition, antioxidants, stabilizers, softening agents, plasticizers, including internal and external plasticizers, impact modifiers, foaming agents, density-adjusting fillers, reinforcing materials, and compatibilizers may also be added to any of the intermediate layer compositions. One of ordinary skill in the art should be aware of the requisite amount for each type of additive to realize the benefits of that particular additive.

The intermediate layer, may be formed from using any suitable method known to one of ordinary skill in the art, particularly for intermediate layers that do not include the castable reactive liquid materials of the present invention. For example, an intermediate layer may be formed by blow molding and covered with a dimpled cover layer formed by injection molding, compression molding, casting, vacuum forming, powder coating, and the like.

For example, castable reactive liquid materials may be applied over the inner ball using a variety of application techniques such as spraying, compression molding, dipping, spin coating, or flow coating methods that are well known in the art. In one embodiment, the castable reactive material is formed over the core using a combination of casting and compression molding. Conventionally, compression molding and injection molding are applied to thermoplastic cover materials, whereas RIM, liquid injection molding, and casting are utilized on thermoset cover techniques.

Cover

As used herein, the term "cover" means the outermost portion of a golf ball. A cover typically includes at least one layer and may contain indentations such as dimples and/or ridges. Paints and/or laminates are typically disposed about the cover to protect the golf ball during use thereof.

The cover provides the interface between the ball and a club. Properties that are desirable for the cover are good moldability, high abrasion resistance, high tear strength, high resilience, and good mold release, among others.

The intermediate layer may be composed of the castable reactive liquid materials and formed using the methods described herein. When an intermediate layer is not comprised of the castable reactive liquid materials, it is composed conventional materials known to one of ordinary skill in the art may be used, including thermoplastic and thermosetting materials as discussed below.

Prior to forming the cover layer, the inner ball, i.e., the core and any intermediate layers disposed thereon, may be surface treated to increase the adhesion between the outer surface of the inner ball and the cover. Examples of such surface treatment may include mechanically or chemically abrading the outer surface of the subassembly. Additionally, the inner ball may be subjected to corona discharge or plasma treatment prior to forming the cover around it. Other layers of the ball, e.g., the core, also may be surface treated. Examples of these and other surface treatment techniques can be found in U.S. Pat. No. 6,315,915, the entirety of which is incorporated by reference herein.

The intermediate layer may be composed of the castable reactive liquid materials and formed using the methods described hereinabove. When an intermediate layer is not comprised of the castable reactive liquid materials, it is composed conventional materials known to one of ordinary skill in the art may be used, including thermoplastic and thermosetting materials as discussed below.

For example, the cover can include any suitable cover or cover layer materials, known to one of ordinary skill in the art, including thermoplastic and thermosetting materials, but preferably the cover or cover layer can include any suitable materials, such as ionic copolymers of ethylene and an unsaturated monocarboxylic acid which are available under the trademark SURLYN of E. I. DuPont de Nemours & Co., of Wilmington, Del., or IOTEK or ESCOR of Exxon. These are copolymers or terpolymers of ethylene and methacrylic acid or acrylic acid partially neutralized with salts of zinc, sodium, lithium, magnesium, potassium, calcium, manganese, nickel or the like, in which the salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, maleic, fumaric or itaconic acid.

This golf ball can likewise include one or more homopolymeric or copolymeric cover or cover layer materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst;

(3) Polyurethanes, such as those prepared from polyols and diisocyanates or polyisocyanates and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, dimerized fatty acids, as well as those from amino acids such as poly(caprolactam), and blends of polyamides with SURLYN, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX, sold by Atofina Chemicals, Inc. of King of Prussia, Pa.;

(8) Polyphenylene oxide resins or blends of polyphenylene oxide with high impact polystyrene as sold under the trademark NORYL by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL by E. I. DuPont de Nemours & Co. of Wilmington, Del., and LOMOD by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

Preferably, the cover includes polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethelyne vinyl alcohol), poly(tetrafluoroethylene) and their copolymers including functional comonomers, and blends thereof. Suitable cover compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. More preferably, in a low spin rate embodiment designed for maximum distance, the acrylic or methacrylic acid is present in about 15 to 35 weight percent, making the ionomer a high modulus ionomer. In a high spin embodiment, the cover includes an ionomer where an acid is present in about 10 to 15 weight percent and includes a softening comonomer.

The cover typically has a thickness to provide sufficient strength, good performance characteristics and durability. The cover of the golf balls typically has a thickness of at least about 0.03 inches, preferably 0.03 to 0.125 inches, and more preferably from about 0.05 to 0.1 inches. The golf balls also typically have at least about 60 percent dimple coverage, preferably at least about 70 percent dimple coverage, of the surface area of the cover.

Typically, the covers are formed around the solid or wound cores by either compression molding preformed half-shells of the cover stock material or by injection molding the cover stock about the core. Half-shells are made by injection molding a cover stock into a conventional half-shell mold in a conventional manner. The preferred method is compression molding of preformed half-shells The cover may include a plurality of layers, e.g., an inner cover layer disposed about a golf ball center and an outer cover layer formed thereon. For example, the present invention encompasses a golf ball having a core, a thin inner cover layer, and a thin outer cover layer disposed thereon. For example, the core may be formed of a re-crosslinked product of the present invention, the inner cover layer formed of an ionomer blend, and the outer cover layer formed of a polyurea composition. In another embodiment, the outer cover layer has a different hardness than the inner cover layer.

While hardness gradients are typically used in a golf ball to achieve certain characteristics, the present invention also contemplates the compositions of the invention being used in a golf ball with multiple cover layers having essentially the same hardness, wherein at least one of the layers has been modified in some way to alter a property that affects the performance of the ball. Such ball constructions are disclosed in co-pending U.S. patent application Ser. No. 10/167,744, filed Jun. 13, 2002, entitled "Golf Ball with Multiple Cover Layers," the entire disclosure of which is incorporated by reference herein.

In one such embodiment, both covers layers can be formed of the same material and have essentially the same hardness, but the layers are designed to have different coefficient of friction values. In another embodiment, the compositions of the invention are used in a golf ball with multiple cover layers having essentially the same hardness, but different rheological properties under high deformation. Another aspect of this embodiment relates to a golf ball with multiple cover layers having essentially the same hardness, but different thicknesses to simulate a soft outer cover over hard inner cover ball.

In another aspect of this concept, the cover layers of a golf ball have essentially the same hardness, but different properties at high or low temperatures as compared to ambient temperatures. In particular, this aspect of the invention is directed to a golf ball having multiple cover layers wherein the outer cover layer composition has a lower flexural modulus at reduced temperatures than the inner cover layer, while the layers retain the same hardness at ambient and reduced temperatures, which results in a simulated soft outer cover layer over a hard inner cover layer feel. For example, certain polyureas may have a much more stable flexural modulus at different temperatures than ionomer resins and thus, could be used to make an effectively "softer" layer at lower temperatures than at ambient or elevated temperatures.

Yet another aspect of this concept relates to a golf ball with multiple cover layers having essentially the same hardness, but different properties under wet conditions as compared to dry conditions. Wettability of a golf ball layer may be affected by surface roughness, chemical heterogeneity, molecular orientation, swelling, and interfacial tensions, among others. Thus, non-destructive surface treatments of a golf ball layer may aid in increasing the hydrophilicity of a layer, while highly polishing or smoothing the surface of a golf ball layer may decrease wettability. U.S. Pat. Nos. 5,403,453 and 5,456,972 disclose methods of surface treating polymer materials to affect the wettability, the entire disclosures of which are incorporated by reference herein. In addition, plasma etching, corona treating, and flame treating may be useful surface treatments to alter the wettability to desired conditions. Wetting agents may also be added to the golf ball layer composition to modify the surface tension of the layer.

Thus, the differences in wettability of the cover layers according to the invention may be measured by a difference in contact angle. The contact angles for a layer may be from about 1° (low wettability) to about 180° (very high wettability). In one embodiment, the cover layers have contact angles that vary by about 1° or greater. In another embodiment, the contact angles of the cover layers vary by about 3° or greater. In yet another embodiment, the contact angles of the cover layers vary by about 5° or greater.

Other non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, and US2002/0028885. The entire disclosures of these patents and published patent are incorporated by reference.

The conventional cover or cover layer material may be applied over an inner ball using a variety of application techniques such as spraying, compression molding, dipping, spin coating, or flow coating methods that are well known in the art. In one embodiment, the conventional cover or cover layer material is used to form a cover over the core using a combination of casting and compression molding. Conventionally, compression molding and injection molding are applied to thermoplastic cover materials, whereas RIM, liquid injection molding, and casting are employed on thermoset cover materials.

U.S. Pat. No. 5,733,428, the entire disclosure of which is incorporated by reference herein, discloses a useful method for forming a polyurethane cover on a golf ball core.

For example, once the conventional cover or cover layer material is mixed, an exothermic reaction commences and continues until the material is solidified around the core. It is important that the viscosity be measured over time, so that the subsequent steps of filling each mold half, introducing the core into one half and closing the mold can be properly timed for accomplishing centering of the core cover halves fusion and achieving overall uniformity. A suitable viscosity range of the curing mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in a motorized mixer inside a mixing head by feeding through lines metered amounts of curative and prepolymer. Top preheated mold halves are filled and placed in fixture units using centering pins moving into apertures in each mold. At a later time, the cavity of a bottom mold half, or the cavities of a series of bottom mold halves, is filled with similar mixture amounts as used for the top mold halves. After the reacting materials have resided in top mold halves for about 40 to about 100 seconds, preferably for about 70 to about 80 seconds, a core is lowered at a controlled speed into the gelling reacting mixture.

A ball cup holds the ball core through reduced pressure (or partial vacuum). Upon location of the core in the halves of the mold after gelling for about 4 to about 12 seconds, the vacuum is released allowing the core to be released. In one embodiment, the vacuum is released allowing the core to be released after about 5 seconds to about 10 seconds. The mold halves, with core and solidified cover half thereon, are removed from the centering fixture unit, inverted and mated with second mold halves which, at an appropriate time earlier, have had a selected quantity of reacting prepolymer and saturated curing agent introduced therein to commence gelling.

Similarly, U.S. Pat. No. 5,006,297 and U.S. Pat. No. 5,334,673 both also disclose suitable molding techniques that may be utilized to apply the castable reactive liquids employed in the present invention. However, the method of the invention is not limited to the use of these techniques; other methods known to those skilled in the art may also be employed. For instance, other methods for holding the ball core may be utilized instead of using a partial vacuum.

Dimples

The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281.

In one embodiment of the present invention, the golf ball has an icosahedron dimple pattern that includes 20 triangles made from about 362 dimples and, except perhaps for the mold parting line, does not have a great circle that does not intersect any dimples. Each of the large triangles, preferably, has an odd number of dimples (7) along each side and the small triangles have an even number of dimples (4) along each side. To properly pack the dimples, the large triangle has nine more dimples than the small triangle. In another embodiment, the ball has five different sizes of dimples in total. The sides of the large triangle have four different sizes of dimples and the small triangles have two different sizes of dimples.

In another embodiment of the present invention, the golf ball has an icosahedron dimple pattern with a large triangle including three different dimples and the small triangles having only one diameter of dimple. In a preferred embodiment, there are 392 dimples and one great circle that does not intersect any dimples. In another embodiment, more than five alternative dimple diameters are used.

In one embodiment of the present invention, the golf ball has an octahedron dimple pattern including eight triangles made from about 440 dimples and three great circles that do not intersect any dimples. In the octahedron pattern, the pattern includes a third set of dimples formed in a smallest triangle inside of and adjacent to the small triangle. To properly pack the dimples, the large triangle has nine more dimples than the small triangle and the small triangle has nine more dimples than the smallest triangle. In this embodiment, the ball has six different dimple diameters distributed over the surface of the ball. The large triangle has five different dimple diameters, the small triangle has three different dimple diameters and the smallest triangle has two different dimple diameters.

Alternatively, the dimple pattern can be arranged according to phyllotactic patterns, such as described in U.S. Pat. No. 6,338,684, which is incorporated herein in its entirety.

Dimple patterns may also be based on Archimedean patterns including a truncated octahedron, a great rhombcuboctahedron, a truncated dodecahedron, and a great rhombicosidodecahedron, wherein the pattern has a non-linear parting line, as disclosed in U.S. patent application Ser. No. 10/078,417, which is incorporated by reference herein.

The golf balls of the present invention may also be covered with non-circular shaped dimples, i.e., amorphous shaped dimples, as disclosed in U.S. Pat. No. 6,409,615, which is incorporated in its entirety by reference herein.

Dimple patterns that provide a high percentage of surface coverage are preferred, and are well known in the art. For example, U.S. Pat. Nos. 5,562,552, 5,575,477, 5,957,787, 5,249,804, and 4,925,193 disclose geometric patterns for positioning dimples on a golf ball. In one embodiment, the golf balls of the invention have a dimple coverage of the surface area of the cover of at least about 60 percent, preferably at least about 65 percent, and more preferably at least 70 percent or greater. Dimple patterns having even higher dimple coverage values may also be used with the present invention. Thus, the golf balls of the present invention may have a dimple coverage of at least about 75 percent or greater, about 80 percent or greater, or even about 85 percent or greater.

In addition, a tubular lattice pattern, such as the one disclosed in U.S. Pat. No. 6,290,615, which is incorporated by reference in its entirety herein, may also be used with golf balls of the present invention. The golf balls of the present invention may also have a plurality of pyramidal projections disposed on the intermediate layer of the ball, as disclosed in U.S. Pat. No. 6,383,092, which is incorporated in its entirety by reference herein. The plurality of pyramidal projections on the golf ball may cover between about 20 percent to about 80 of the surface of the intermediate layer.

In an alternative embodiment, the golf ball may have a non-planar parting line allowing for some of the plurality of pyramidal projections to be disposed about the equator. Such a golf ball may be fabricated using a mold as disclosed in co-pending U.S. patent application Ser. No. 09/442,845, filed Nov. 18, 1999, entitled "Mold For A Golf Ball," and which is incorporated in its entirety by reference herein. This embodiment allows for greater uniformity of the pyramidal projections.

Several additional non-limiting examples of dimple patterns with varying sizes of dimples are also provided in U.S. Pat. No. 6,358,161 and U.S. Pat. No. 6,213,898, the entire disclosures of which are incorporated by reference herein.

The total number of dimples on the ball, or dimple count, may vary depending on such factors as the dimple size and the selected pattern. In general, the total number of dimples on the ball preferably is between about 100 to about 1000 dimples, although one skilled in the art would recognize that differing dimple counts within this range can significantly alter the flight performance of the ball. In one embodiment, the dimple count is about 380 dimples or greater, but more preferably is about 400 dimples or greater, and even more preferably is about 420 dimples or greater. In one embodiment, the dimple count on the ball is about 422 dimples. In some cases, it may be desirable to have fewer dimples on the ball. Thus, one embodiment of the present invention has a dimple count of about 380 dimples or less, and more preferably is about 350 dimples or less.

Dimple profiles revolving a catenary curve about its symmetrical axis may increase aerodynamic efficiency, provide a convenient way to alter the dimples to adjust ball performance without changing the dimple pattern, and result in uniformly increased flight distance for golfers of all swing speeds. Thus, catenary curve dimple profiles, as disclosed in U.S. patent application Ser. No. 09/989,191, filed Nov. 21, 2001, entitled "Golf Ball Dimples with a Catenary Curve Profile," which is incorporated in its entirety by reference herein, is contemplated for use with the golf balls of the present invention.

Golf Ball Post-Processing

The golf balls of the present invention may be painted, coated, or surface treated for further benefits.

For example, golf balls covers frequently contain a fluorescent material and/or a dye or pigment to achieve the desired color characteristics. A golf ball of the invention may also be treated with a base resin paint composition, however, as disclosed in U.S. Patent Publication No. 2002/0082358, which includes a 7-triazinylamino-3-phenylcoumarin derivative as the fluorescent whitening agent to provide improved weather resistance and brightness.

In addition, trademarks or other indicia may be stamped, i.e., pad-printed, on the outer surface of the ball cover, and the stamped outer surface is then treated with at least one clear coat to give the ball a glossy finish and protect the indicia stamped on the cover.

The golf balls of the invention may also be subjected to dye sublimation, wherein at least one golf ball component is subjected to at least one sublimating ink that migrates at a depth into the outer surface and forms an indicia. The at least one sublimating ink preferably includes at least one of an azo dye, a nitroarylamine dye, or an anthraquinone dye. U.S. patent application Ser. No. 10/012,538, filed Dec. 12, 2001, entitled, "Method of Forming Indicia on a Golf Ball," the entire disclosure of which is incorporated by reference herein.

Laser marking of a selected surface portion of a golf ball causing the laser light-irradiated portion to change color is also contemplated for use with the present invention. U.S. Pat. Nos. 5,248,878 and 6,075,223 generally disclose such methods, the entire disclosures of which are incorporated by reference herein. In addition, the golf balls may be subjected to ablation, i.e., directing a beam of laser radiation onto a portion of the cover, irradiating the cover portion, wherein the irradiated cover portion is ablated to form a detectable mark, wherein no significant discoloration of the cover portion results therefrom. Ablation is discussed in U.S. Pat. No. 6,462,303, the entirety of which is incorporated by reference herein.

Protective and decorative coating materials, as well as methods of applying such materials to the surface of a golf ball cover, are well known in the golf ball art. Generally, such coating materials include urethanes, urethane hybrids, epoxies, polyesters and acrylics. If desired, more than one coating layer can be used. The coating layer(s) may be applied by any suitable method known to one of ordinary skill in the art. In one embodiment, the coating layer(s) is applied to the golf ball cover by an in-mold coating process, such as described in U.S. Pat. No. 5,849,168, which is incorporated in its entirety by reference herein.

Golf Ball Properties

The properties such as hardness, modulus, core diameter, intermediate layer thickness and cover layer thickness of the golf balls of the present invention have been found to effect play characteristics such as spin, initial velocity and feel of the present golf balls. For example, the flexural and/or tensile modulus of the intermediate layer are believed to have an effect on the "feel" of the golf balls of the present invention.

Component Dimensions

Dimensions of golf ball components, i.e., thickness and diameter, may vary depending on the desired properties. For the purposes of the invention, any layer thickness may be employed. Non-limiting examples of the various embodiments outlined above are provided here with respect to layer dimensions.

The present invention relates to golf balls of any size. While "The Rules of Golf" by the USGA dictate specifications that limit the size of a competition golf ball to more than 1.680 inches in diameter, golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches to about 1.740 inches is most preferred, however diameters anywhere in the range of from 1.700 to about 1.950 inches can be used. Preferably, the overall diameter of the core and all intermediate layers is about 80 percent to about 98 percent of the overall diameter of the finished ball.

The core may have a diameter ranging from about 0.090 inches to about 1.650 inches. In one embodiment, the diameter of the core of the present invention is about 1.200 inches to about 1.630 inches. In another embodiment, the diameter of the core is about 1.300 inches to about 1.600 inches, preferably from about 1.390 inches to about 1.600 inches, and more preferably from about 1.500 inches to about 1.600 inches. In yet another embodiment, the core has a diameter of about 1.550 inches to about 1.650 inches.

The core of the golf ball may also be extremely large in relation to the rest of the ball. For example, in one embodiment, the core makes up about 90 percent to about 98 percent of the ball, preferably about 94 percent to about 96 percent of the ball. In this embodiment, the diameter of the core is preferably about 1.540 inches or greater, preferably about 1.550 inches or greater. In one embodiment, the core diameter is about 1.590 inches or greater. In another embodiment, the diameter of the core is about 1.640 inches or less.

When the core includes an inner core layer and an outer core layer, the inner core layer is preferably about 0.9 inches or greater and the outer core layer preferably has a thickness of about 0.1 inches or greater. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 1.1 inches and the outer core layer has a thickness of about 0.20 inches to about 0.03 inches.

The cover typically has a thickness to provide sufficient strength, good performance characteristics, and durability. In one embodiment, the cover thickness is from about 0.02 inches to about 0.35 inches. The cover preferably has a thickness of about 0.02 inches to about 0.12 inches, preferably about 0.1 inches or less. When the compositions of the invention are used to form the outer cover of a golf ball, the cover may have a thickness of about 0.1 inches or less, preferably about 0.07 inches or less. In one embodiment, the outer cover has a thickness from about 0.02 inches to about 0.07 inches. In another embodiment, the cover thickness is about 0.05 inches or less, preferably from about 0.02 inches to about 0.05 inches. In yet another embodiment, the outer cover layer is between about 0.02 inches to about 0.045 inches. In still another embodiment, the outer cover layer is about 0.025 to about 0.04 inches thick. In one embodiment, the outer cover layer is about 0.03 inches thick.

In embodiments where the cover, intermediate layer or core layer is composed of conventional materials, a hemispherical shell can be formed first. The hemispherical shell generally has an outer radius of from about 0.45 inches to about 0.900 inches and a thickness from about 0.001 inches to about 0.500 inches. The outer radius and thickness varies depending on whether the hemispherical shell is formed for a cover, intermediate layer or a core layer, as disclosed herein The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. In one embodiment, the thickness of the intermediate layer is about 0.09 inches or less, preferably about 0.06 inches or less. In another embodiment, the intermediate layer thickness is about 0.05 inches or less, more preferably about 0.01 inches to about 0.045 inches. In one embodiment, the intermediate layer, thickness is about 0.02 inches to about 0.04 inches. In another embodiment, the intermediate layer thickness is from about 0.025 inches to about 0.035 inches. In yet another embodiment, the thickness of the intermediate layer is about 0.035 inches thick. In still another embodiment, the inner cover layer is from about 0.03 inches to about 0.035 inches thick. Varying combinations of these ranges of thickness for the intermediate and outer cover layers may be used in combination with other embodiments described herein.

The ratio of the thickness of the intermnediate layer to the outer cover layer is preferably about 10 or less, preferably from about 3 or less. In another embodiment, the ratio of the thickness of the intermediate layer to the outer cover layer is about 1 or less.

The core and intermediate layer(s) together form an inner ball preferably having a diameter of about 1.48 inches or greater for a 1.68-inch ball. In one embodiment, the inner ball of a 1.68-inch ball has a diameter of about 1.52 inches or greater. In another embodiment, the inner ball of a 1.68-inch ball has a diameter of about 1.66 inches or less. In yet another embodiment, a 1.72-inch (or more) ball has an inner ball diameter of about 1.50 inches or greater. In still another embodiment, the diameter of the inner ball for a 1.72-inch ball is about 1.70 inches or less.

Hardness

The molding process and composition of golf ball portions typically results in a gradient of material properties. Methods employed in the prior art generally exploit hardness to quantify these gradients. Most golf balls consist of layers having different hardnesses, e.g., hardness gradients, to achieve desired performance characteristics. The present invention contemplates golf balls having hardness gradients between layers, as well as those golf balls with layers having the same hardness.

It should be understood, especially to one of ordinary skill in the art, that there is a fundamental difference between "material hardness" and "hardness, as measured directly on a golf ball." Material hardness is defined by the procedure set forth in ASTM-D2240-00 and generally involves measuring the hardness of a flat "slab" or "button" formed of the material of which the hardness is to be measured. Generally, ASTM-D2240-00 requires calibration of durometers, which have scale readings from 0 to 100. However, readings below 10 or above 90 are not considered reliable, as noted in ASTM-D2240-00, and accordingly, all the hardness values herein are within this range. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. Hardness is a qualitative measure of static modulus and does not represent the modulus of the material at the deformation rates associated with golf ball use, i.e., impact by a club. As is well known to one skilled in the art of polymer science, the time-temperature superposition principle may be used to emulate alternative deformation rates. For golf ball portions including polybutadiene, a 1-Hz oscillation at temperatures between 0° C. and −50° C. are believed to be qualitatively equivalent to golf ball impact rates. Therefore, measurement of loss tangent and dynamic stiffness at 0° C. to −50° C. may be used to accurately anticipate golf ball performance, preferably at temperatures between about −20° C. and −50° C. It should also be understood that the two measurement techniques are not linearly related and, therefore, one hardness value cannot easily be correlated to the other.

The cores of the present invention may have varying hardnesses, i.e., surface hardness, depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. In another embodiment, the core has a hardness of about 20 Shore C to about 90 Shore C, and preferably from about 30 Shore C to about 90 Shore C. In yet another embodiment, the core has a hardness of about 20 Shore C to about 80 Shore D, preferably from about 20 Shore D to about 70 Shore D. Preferably, the core has a hardness about 30 to about 65 Shore D, and more preferably, the core has a hardness about 35 to about 60 Shore D. As mentioned above, the upper and lower limits of the ranges disclosed herein are interchangeable to form new ranges. For example, the hardness of the core may be from about 20 Shore D to about 80 Shore D, or 50 Shore A to about 65 Shore D.

The core may have a hardness gradient, i.e., a first hardness at a first point, i.e., at an interior location, and a second hardness at a second point, i.e., at an exterior surface, as measured on a molded sphere. In one embodiment, the second hardness is at least about 6 percent greater than the first hardness, preferably about 10 percent greater than the first hardness. In other embodiments, the second hardness is at least about 20 percent greater or at least about 30 percent greater, than the first hardness.

For example, the interior of the core may have a first hardness of about 45 Shore C to about 60 Shore C and the exterior surface of the core may have a second hardness of about 65 Shore C to about 75 Shore C. In one golf ball formulated according to the invention, the first hardness was about 51 Shore C and a second hardness was about 71 Shore C, providing a hardness difference of greater than 20 percent.

In one embodiment, however, the core has a substantially uniform hardness throughout. Thus, in this aspect, the first and second hardness preferably differ by about 5 percent or less, more preferably about 3 percent or less, and even more preferably by about 2 percent or less. In another embodiment, the hardness is uniform throughout the component.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. In yet another embodiment, the hardness of the intermediate layer is about 40 Shore D or greater, preferably about 50 Shore D or greater. In one embodiment, the intermediate layer hardness is from about 30 Shore D to about 90 Shore D, and preferably from about 45 Shore D to about 80 Shore D. In another embodiment, the intermediate layer hardness is from about 50 Shore D to about 70 Shore D. The intermediate layer may also be about 65 Shore D or greater.

When the intermediate layer is intended to be harder than the core layer, the ratio of the intermediate layer hardness to the core hardness preferably about 2 or less. In one embodiment, the ratio is about 1.8 or less. In yet another embodiment, the ratio is about 1.3 or less.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In one embodiment, the cover has a hardness of about 20 Shore A to about 70 Shore D. In another embodiment, the cover itself has a hardness from about 30 Shore D to about 60 Shore D. In one embodiment, the cover has a hardness of about 40 Shore D to about 65 Shore D. In another embodiment, the cover has a hardness less than about 45 Shore D, preferably less than about 40 Shore D, and more preferably about 25 Shore D to about 40 Shore D. In yet another embodiment, the cover hardness is from about 35 to 80 Shore D, preferably from about 45 to 70 Shore D.

In this embodiment when the outer cover layer is softer than the intermediate layer or inner cover layer, the ratio of the Shore D hardness of the outer cover material to the intermediate layer material is about 0.8 or less, preferably about 0.75 or less, and more preferably about 0.7 or less. In another embodiment, the ratio is about 0.5 or less, preferably about 0.45 or less.

In yet another embodiment, the ratio is about 0.1 or less when the cover and intermediate layer materials have hardnesses that are substantially the same. When the hardness differential between the cover layer and the intermediate layer is not intended to be as significant, the cover may have a hardness of about 55 Shore D to about 65 Shore D. In this embodiment, the ratio of the Shore D hardness of the outer cover to the intermediate layer is about 1.0 or less, preferably about 0.9 or less.

The cover hardness may also be defined in terms of Shore C. For example, the cover may have a hardness of about 70 Shore C or greater, preferably about 80 Shore C or greater. In another embodiment, the cover has a hardness of about 90 Shore C or less.

In another embodiment, the cover layer is harder than the intermediate layer. In this design, the ratio of Shore D hardness of the cover layer to the intermediate layer is about 1.33 or less, preferably from about 1.14 or less.

When a two-piece ball is constructed, the core may be softer than the outer cover. For example, the core hardness may range from about 30 Shore D to about 50 Shore D, and the cover hardness may be from about 50 Shore D to about 80 Shore D. In this type of construction, the ratio between the cover hardness and the core hardness is preferably about 1.75 or less. In another embodiment, the ratio is about 1.55 or less. Depending on the materials, for example, if a composition of the invention is acid-functionalized wherein the acid groups are at least partially neutralized, the hardness ratio of the cover to core is preferably about 1.25 or less.

Compression

Depending on the desired properties, balls prepared according to the invention can exhibit substantially the same or higher resilience, or coefficient of restitution (CoR), with a decrease in compression or modulus, compared to balls of conventional construction. As used herein, the term "coefficient of restitution" (CoR) is calculated by dividing the rebound velocity of the golf ball by the incoming velocity when a golf ball is shot out of an air cannon. The CoR testing is conducted over a range of incoming velocities and determined at an inbound velocity of 125 ft/s. Additionally, balls prepared according to the invention can also exhibit substantially higher resilience, or coefficient of restitution (CoR), without an increase in compression, compared to balls of conventional construction. Another measure of this resilience is the "loss tangent," or tan δ, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

The dynamic stiffness is similar in some ways to dynamic modulus. Dynamic stiffness is dependent on probe geometry as described herein, whereas dynamic modulus is a unique material property, independent of geometry. The dynamic stiffness measurement has the unique attribute of enabling quantitative measurement of dynamic modulus and exact measurement of loss tangent at discrete points within a sample article. In the case of this invention, the article is a golf ball core. The golf ball material preferably has a loss tangent below about 0.1 at −50° C., and more preferably below about 0.07 at −50° C.

The resultant golf balls typically have a coefficient of restitution of about 0.7 or more. In another embodiment, the ball has a COR of about 0.75 or more, and more preferably is about 0.78 or more. In another embodiment, the golf ball has a CoR from about 0.7 to about 0.815. In yet another embodiment, the ball has a CoR of about 0.79 or more, and more preferably is about 0.8 or more. Additionally, in each of these embodiments it is also preferred that the COR of the ball is less than about 0.819. Alternatively, the maximum COR of the ball is one that does not cause the golf ball to exceed initial velocity requirements established by regulating entities such as the USPGA.

The golf balls also typically have an Atti compression (which has been referred to as PGA compression in the past) of at least about 40, preferably from about 50 to 120, and more preferably from about 60 to 100. As used herein, the term "Atti compression" is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball and/or a golf ball core. Compression values are dependent on the diameter of the article being measured. The golf ball polybutadiene material typically has a flexural modulus of from about 500 psi to 300,000 psi, preferably from about 2000 to 200,000 psi. The golf ball polybutadiene material typically has a hardness of at least about 15 Shore A, preferably between about 30 Shore A and 80 Shore D, more preferably between about 50 Shore A and 60 Shore D. The specific gravity is typically greater than about 0.7, preferably greater than about 1, for the golf ball polybutadiene material. The dynamic shear storage modulus, or storage modulus, of the golf ball polybutadiene material at about 23° C. is typically at least about 10,000 dyn/cm$^2$, preferably from about $10^4$-$10^{10}$ dyn/cm$^2$, more preferably from about $10^6$ to $10^{10}$ dyn/cm$^2$.

Compression values are dependent on the diameter of the component being measured. The Atti compression of the core, or portion of the core, of golf balls prepared according to the invention is preferably less than about 80, more preferably less than about 75. In another embodiment, the core compression is from about 40 to about 80, preferably from about 50 to about 70. In yet another embodiment, the core compression is preferably below about 50, and more preferably below about 25.

In an alternative, low compression embodiment, the core has a compression less than about 20, more preferably less than about 10, and most preferably, 0. As known to one of ordinary skill in the art, however, the cores generated according to the present invention may be below the measurement of the Atti Compression Gauge. In an embodiment where the core is hard, the compression may be about 90 or greater. In one embodiment, the compression of the hard core ranges from about 90 to about 100.

The core of the present invention may also have a Soft Center Deflection Index (SCDI) compression of less than about 160, more preferably, between about 40 and about 160, and most preferably, between about 60 and about 120.

Initial Velocity and CoR

The present invention encompasses golf balls that conform and meet with USGA initial velocity requirements. There is currently no USGA limit on the CoR of a golf ball, but the initial velocity of the golf ball cannot exceed the current USGA limit of 250±5 feet/second (ft/s). Thus, in one embodiment, the initial velocity is about 245 ft/s or greater and about 255 ft/s or less. In another embodiment, the initial velocity is about 250 ft/s or greater. In another embodiment, the initial velocity is about 253 ft/s to about 254 ft/s. While the current rules on initial velocity require that golf ball manufacturers stay within the limit, one of ordinary skill in the art would appreciate that the golf ball of the invention would readily convert into a golf ball with initial velocity outside of this range. For golf balls intended for use as practice balls, the initial velocity may be below 250 ft/s, and even below 240 ft/s.

As a result, of the initial velocity limitation set forth by the USGA, the goal is to maximize CoR without violating the 255 ft/s limit. In a one-piece solid golf ball, the CoR will depend on a variety of characteristics of the ball, including its composition and hardness. For a given composition, CoR will generally increase as hardness is increased. In a two-piece solid golf ball, e.g., a core and a cover, one of the purposes of the cover is to produce a gain in CoR over that of the core. When the contribution of the core to high CoR is substantial, a lesser contribution is required from the cover. Similarly, when the cover contributes substantially to high CoR of the ball, a lesser contribution is needed from the core.

The present invention encompasses golf balls that have a CoR from about 0.7 to about 0.85. In one embodiment, the CoR is about 0.75 or greater, preferably about 0.78 or greater. In another embodiment, the ball has a CoR of about 0.8 or greater.

In addition, the inner ball preferably has a CoR of about 0.780 or more. In one embodiment, the CoR is about 0.790 or greater.

Flexural Modulus

Accordingly, it is preferable that the golf balls of the present invention have an intermediate layer with a flexural modulus of about 500 psi to about 500,000 psi. More preferably, the flexural modulus of the intermediate layer is about 1,000 psi to about 250,000 psi. Most preferably, the flexural modulus of the intermediate layer is about 2,000 psi to about 200,000 psi.

The flexural modulus of the cover on the golf balls, as measured by ASTM method D-6272-98, is typically greater than about 500 psi, and is preferably from about 500 psi to about 150,000 psi. The flexural moduli of the cover layer is preferably about 2,000 psi or greater, and more preferably about 5,000 psi or greater. In one embodiment, the flexural moduli of the cover is from about 10,000 psi to about 150,000 psi, more preferably from about 15,000 psi to about 120,000 psi, and most preferably from about 18,000 psi to about 110,000 psi. In another embodiment, the flexural moduli of the cover layer is about 100,000 psi or less, preferably about 80,000 or less, and more preferably about 70,000 psi or less. In one embodiment, when the cover layer has a hardness of about 50 Shore D to about 60 Shore D, the cover layer preferably has a flexural modulus of about 55,000 psi to about 65,000 psi.

In one embodiment, the ratio of the flexural modulus of the intermediate layer to the cover layer is about 0.003 to about 50. In another embodiment, the ratio of the flexural modulus of the intermediate layer to the cover layer is about 0.006 to about 4.5. In yet another embodiment, the ratio of the flexural modulus of the intermediate layer to the cover layer is about 0.11 to about 4.5.

In one embodiment, the compositions of the invention are used in a golf ball with multiple cover layers having essentially the same hardness, but differences in flexural moduli. In this aspect of the invention, the difference between the flexural moduli of the two cover layers is preferably about 5,000 psi or less. In another embodiment, the difference in flexural moduli is about 500 psi or greater. In yet another embodiment, the difference in the flexural moduli between the two cover layers, wherein at least one is reinforced is about 500 psi to about 10,000 psi, preferably from about 500 psi to about 5,000 psi. In one embodiment, the difference in flexural moduli between the two cover layers formed of unreinforced or unmodified materials is about 1,000 psi to about 2,500 psi.

Specific Gravity and Shear/Cut Resistance

The specific gravity of a cover or intermediate layer including the compositions of the invention is preferably at least about 0.7. In another embodiment, the specific gravity of a cover or intermediate layer including the compositions of the invention is at least about 0.6. In yet another embodiment, the specific gravity of the cover or intermediate layer is at least about 1.0, preferably at least about 0.9 and more preferably at least about 0.8.

The specific gravity of a core including the compositions of the invention is greater than 1.5, more preferably greater than 1.8 and more preferably greater than 2.0. In another embodiment, the specific gravity of the fore including the compositions of the invention is greater than 2.5, and can be as high as 5.0 and 10.0.

The cut resistance of a golf ball cover may be determined using a shear test having a scale from 1 to 9 assessing damage and appearance. The scale for this shear test is known to one of ordinary skill in the art. In one embodiment, the damage rank is preferably about 3 or less, more preferably about 2 or less. In another embodiment, the damage rank is about 1 or less. The appearance rank of a golf ball of the invention is preferably about 3 or less. In one embodiment, the appearance rank is about 2 or less, preferably about 1 or less.

EXAMPLES

The following examples are only representative of the methods and materials for use in golf ball compositions and golf balls of this invention, and are not to be construed as limiting the scope of the invention in any way.

Example 1

Core Expansion Study

Two golf ball precursors, in particular, cores having the compositions disclosed in Table 1 (components are listed in pph), were heated to various temperatures and nameplate and equator dimensions were measured at each temperature.

TABLE 1

| Core 1 (ppm) | | Core 2 (ppm) | |
|---|---|---|---|
| Shell 1220 | (51.31) | Shell 1220[a] | (53.57) |
| NEOCIS BR40 | (9.33) | NEOCIS BR40 | (10.37) |
| — | | SBR 1502 | (3.67) |
| Zinc diacrylate | (18.70) | Zinc diacrylate | (18.74) |
| VAROX 231 XL | (0.26) | VAROX 231 XL | (0.29) |
| VULCUP 40KE | (0.14) | VULVUP 40KE | (0.16) |
| Colorant | (0.66) | Colorant | (0.11) |

TABLE 1-continued

| Core 1 (ppm) | | Core 2 (ppm) | |
|---|---|---|---|
| ZnO | (9.74) | ZnO | (2.94) |
| Regrind | (9.16) | Regrind | (10.14) |
| SR350 | (0.70) | — | |

Core 1 is a 1.580" core that comprises polybutadiene (Shell 1220, manufactured by Shell Chemical and NEOCIS BR40, manufactured by Enichem Elastomers), zinc diacrylate, free radical initiators (VULCUP 40KE (bis (t-butylperoxy) diisopropylbenzene) and VAROX 231XL (1,1-di(t-butylperoxy) 3,3,5-trimethyl cyclohexane), a colorant, zinc oxide, regrind (recycled material from golf ball component manufacture), and trimethylolpropanetrimethacrylate (SR350, a trifunctional coagent, manufactured by Sartomer, Inc.), in the amounts shown in Table 1.

Core 2 is a 1.580" core that comprises polybutadiene (Shell 1220, manufactured by Shell Chemical and NEOCIS BR40, manufactured by Enichem Elastomers), styrene-butadiene rubber (SBR 1502, available from Hules Mexicanos, or from Goodrich Rubber Company as "Ameripol" 1502) zinc diacrylate, free radical initiators (VULCUP 40KE (bis (t-butylperoxy) diisopropylbenzene) and VAROX 231XL (1,1-di(t-butylperoxy) 3,3,5-trimethyl cyclohexane), a colorant, zinc oxide, and regrind, in the amounts shown in Table 1.

TABLE 2

| | Core 1 | | Core 2 | |
|---|---|---|---|---|
| Temp (° F.) | Nameplates (inches) | Equator (inches) | Nameplates (inches) | Equator (inches) |
| 70 | 1.580 | 1.579 | 1.579 | 1.579 |
| 120 | 1.590 | 1.589 | 1.590 | 1.588 |
| 170 | 1.595 | 1.595 | 1.596 | 1.595 |
| 220 | 1.602 | 1.602 | 1.602 | 1.602 |
| 270 | 1.612 | 1.612 | 1.612 | 1.612 |
| 320 | 1.617 | 1.617 | 1.617 | 1.617 |

Table 2 shows the effect of increasing temperatures on nameplate and equator dimensions of Core 1 and Core 2, starting at 70° F. and increasing in 50° F. increments to 320° F. After each core was heated to the desired temperature, each core was stabilized in an air oven for one hour for each temperature increment before measurements were taken. Core 1 and Core 2 each exhibited a linear expansion with increasing temperatures. Core 1 and Core 2 also exhibited almost identical rate of expansion of about 0.0008"/50° F.

Example 2

Preparation of Cover Using Aliphatic Polyurethane Elastomers

This example illustrates making a cover using an aliphatic polyurethane elastomer in accordance with the present invention. In particular, Table 3 illustrates the components and conditions used to make the golf ball cover composition.

TABLE 3

| | |
|---|---|
| Prepolymer (no. equivalents) | $H_{12}$MDI/PTMEG 2000 (1.00) |
| Curing Agent (no. equivalents) | 1,4-butanediol (0.95) |
| White dispersion | 3.5% of the elastomer |
| Prepolymer temperature | 130° F. |
| Curative temperature | Ambient Temperature |
| Mold temperature | 130° F. |
| Core temperature | Ambient Temperature |
| Delay time | None |
| Post-cure temperature and time | 155° F. for 5 minutes to 11 minutes |

1.00 equivalent of $H_{12}$MDI/PTMEG 2000, 0.95 equivalents of 1,4-butanediol and white dispersion (3.5% by weight of total elastomer) was mixed to form a castable reactive liquid material. The castable reactive liquid material was heated to 130° F. and is used to fill a first mold half having a temperature of 130° F. After about 60 seconds, a golf ball core that was heated to 105° F. was lowered into the castable reactive liquid material in the first mold half. The golf ball core was held in place by vacuum for about 22 seconds. A second mold half was heated to 130° F. and filled with castable reactive liquid material, also heated to 130° F. After about 60 seconds of filling the second mold half, the mold halves were mated for about 22 seconds and then post-cured at 155° F. for 11, forming a cosmetically defect-free golf ball cover.

Example 3

Preparation of Cover Using Aliphatic Polyurea Elastomers

This example illustrates making a cover using an aliphatic polyurea elastomer in accordance with the present invention. In particular, Table 4 illustrates the components and conditions used to make the golf ball cover composition.

TABLE 4

| | |
|---|---|
| Prepolymer (no. equivalents) | $H_{12}$MDI/Jeffamine D2000/Des N-3300 (1.00) |
| Curing Agent (no. equivalents) | Clearlink 1000 (1.02) |
| White dispersion | 4.5% of the elastomer |
| Prepolymer temperature | 160° F. |
| Curative temperature | Ambient Temperature |
| Mold temperature | 115° F. |
| Core temperature | Ambient Temperature |
| First post-cure condition | 8 minutes at ambient temperature |
| Second post-cure condition | 155° F. for 8 minutes |

1.00 equivalent of $H_{12}$MDI/Jeffamine D2000/Des N-3300, 0.95 equivalents of Clearlink 1000 and white dispersion (4.5% by weight of total elastomer) was mixed to form a castable reactive liquid material. The castable reactive liquid material was heated to 160° F. and is used to fill a first mold half having a temperature of 95° F. After about 60 seconds, a golf ball core that was heated to 95° F. was lowered into the castable reactive liquid material in the first mold half. The golf ball core was held in place by vacuum for about 22 seconds. A second mold half was heated to 95° F. and filled with castable reactive liquid material, heated to 160° F. After about 60 seconds of filling the second mold half, the mold halves were mated for about 22 seconds, forming a cosmetically defect-free golf ball cover.

Example 4

Preparation of Cover Using Aliphatic Polyurea Elastomers

This example illustrates making a cover using an aliphatic polyurea elastomer in accordance with the present invention.

In particular, Table 5 illustrates the components and conditions used to make the golf ball cover composition.

TABLE 5

| | |
|---|---|
| Prepolymer (no. equivalents) | H$_{12}$MDI/Jeffamine D2000/Des N-3300 (1.00) |
| Curing Agent (no. equivalents) | Clearlink 1000 (1.02) |
| White dispersion | 4.5% of the elastomer |
| Prepolymer temperature | 160° F. |
| Curative temperature | Ambient Temperature |
| Mold temperature | 115° F. |
| Core temperature | 45° F. |
| First post-cure condition | None |
| Second post-cure condition | Ambient temperature for about 20 minutes |

1.00 equivalent of H$_{12}$MDI/Jeffamine D2000/Des N-3300 prepolymer, 1.02 equivalents of Clearlink 1000 and white dispersion (4.5% by weight of the total elastomer) was mixed to form a castable reactive liquid material. The castable reactive liquid material was heated to 160° F. and was mixed with the room temperature curative blend. The mixture was then used to fill a first mold half having a temperature of 115° F. After about 60 seconds, a golf ball core that was chilled to about 45° F. was lowered into the castable reactive liquid material in the first mold half. The golf ball core was held in place by vacuum for about 22 seconds. A second mold half was heated to 115° F. and filled with the mixed castable reactive liquid material. After about 60 seconds of filling the second mold half, the mold halves were mated for about 22 seconds, forming a cosmetically defect-free golf ball cover.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. For example, the compositions and methods of forming cosmetically defect-free golf ball components of the present invention may be used in a variety of golf equipment, for example, golf shoes for sole applications, as well as in inserts for golf putters. Such modifications are also intended to fall within the scope of the appended claims.

We claim:

1. A method of forming a cosmetically defect-free golf ball component comprising the steps of:
    providing a golf ball precursor;
    mixing at least one of a saturated polyurea prepolymer, a saturated polyurethane prepolymer, or mixture thereof and at least one saturated curing agent to form a castable reactive liquid material;
    filling a first set of mold halves with a first amount of the material;
    cooling the golf ball precursor such that the golf ball precursor has a temperature of about 20° F. to about 50° F., lowering the cooled golf ball precursor into the first set of mold halves after a first predetermined time, wherein the precursor is held by vacuum for second predetermined time, and wherein the second predetermined time is sufficient for complete exothermic reaction of the first amount of material;
    releasing the golf ball precursor from the vacuum providing a partially covered golf ball precursor;
    filling a second set of mold halves with a second amount of the material, wherein the first and second amounts are substantially similar, and wherein an exothermic reaction of the second amount commences; and
    mating the second set of mold halves with the partially covered precursor after a third predetermined time, wherein the mold halves are mated for a fourth predetermined time that is sufficient for complete exothermic reaction of the second amount of material.

2. The method of claim 1, wherein the golf ball component comprises a core and a cover layer.

3. The method of claim 1, wherein the golf ball precursor comprises a center and optionally at least one of an outer core layer, an intermediate layer, or a combination thereof.

4. The method of claim 1, wherein the golf ball precursor has a temperature of about 25° F. to about 40° F.

5. The method of claim 1, further comprising post curing the defect-free golf ball component at room temperature for about 5 minutes to about 24 hours or from about 100° F. to about 180° F. for about 1 minute to about 30 minutes.

6. The method of claim 5, further comprising a predetermined delay time after forming the golf ball component and prior to post curing, wherein the predetermined delay time is from about 60 seconds to about 6 hours.

7. The method of claim 1, wherein the at least one polyurea prepolymer, polyurethane prepolymer, or mixture thereof and the at least one saturated curing agent is mixed at a temperature of between about 70° F. to about 200° F. prior to filling the first set or second set of mold halves.

8. The method of claim 1, wherein the first and second sets of mold halves are each independently at room temperature or preheated to a temperature of between about 65° F. to about 140° F.

9. The method of claim 8, wherein the temperature of the first and second sets of mold halves are each independently at a temperature of between about 65° F. to about 100° F.

10. The method of claim 1, wherein the first predetermined time and third predetermined time each is between about 30 seconds to about 120 seconds.

11. The method of claim 1, wherein the second predetermined time and fourth predetermined time each is independently between about 3 seconds and about 30 seconds.

12. The method of claim 1, wherein the at least one polyurethane prepolymer is formed by contacting or reacting at least one saturated polyisocyanates with at least one saturated polyol and the at least one polyurea prepolymer is formed by contacting or reacting at least one saturated polyisocyanate with at least one saturated polyamine.

13. The method of claim 12, wherein the at least one saturated polyisocyanate has the generic structure: (O=C=N)$_n$—R—(N=C=O)$_{n'}$, wherein n and n' are each independently 1, 2 or 3, R is a substituted or unsubstituted cyclic, linear or branched saturated hydrocarbon moiety containing from about 1 to about 20 carbon atoms.

14. The method of claim 13, wherein the at least one saturated polyisocyanate is selected from the group consisting of ethylene diisocyanate; propylene-1,2-diisocyanate; tetramethylene-1,2-diisocyanate; tetramethylene-1,3-diisocyanate; tetramethylene-1,4-diisocyanate; 1,6-hexamethylenediisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophoronediisocyanate (IPDI); isocyanurate of HDI; uretdione of HDI; biuret of HDI; triisocyanate of 2,2,4-trimethyl-1,6-hexane diisocyanate (TMDI); 4,4'-dicyclohexylmethane diisocyanate (H$_{12}$MDI); and mixtures thereof.

15. The method of claim 12, wherein the at least one saturated polyol is selected from the group consisting of a polyether polyol, a polycaprolactone polyol, a polyester polyol, a polycarbonate polyol, a hydrocarbon polyol, a glycerol; a castor oil and derivatives thereof; a saturated hydroxy-terminated hydrocarbon polyol; an acrylic polyol; an acid-functionalized polyol based on a carboxylic, sulfonic, or phosphoric acid group; a dimer alcohol converted from the saturated dimerized fatty acid; and a mixture thereof.

16. The method of claim 15, wherein the at least one saturated polyol is selected from the group consisting of polytetramethylene ether glycol (PTMEG), modified polytetramethylene ether glycol (PTG-L), poly(oxyethylene) glycol, poly(oxypropylene) glycol, poly(ethylene oxide capped oxypropylene) glycol, diethylene glycol initiated polycaprolactone, propylene glycol initiated polycaprolactone, 1,4-butanediol initiated polycaprolactone, trimethylol propane initiated polycaprolactone, neopentyl glycol initiated polycaprolactone, 1,6-hexanediol initiated polycaprolactone, polytetramethylene ether glycol (PTMEG) initiated polycaprolactone, polyethylene adipate glycol, polyethylene propylene adipate glycol, polybutylene adipate glycol, polyethylene butylene adipate glycol, polyhexamethylene adipate glycol, polyhexamethylene butylene adipate glycol, poly(hexamethylene carbonate) glycol, hydroxy-terminated liquid isoprene rubber (LIR), hydroxy-terminated polybutadiene polyol, and mixtures thereof.

17. The method of claim 12, wherein the at least one saturated polyamine is a primary or secondary $C_1$-$C_{20}$ substituted or unsubstituted aliphatic or cycloaliphatic polyamine having 2 to 6 amino groups.

18. The method of claim 17, wherein the at least one saturated polyamine is selected from the group consisting of a polytetramethylene ether diamine, a polyoxypropylene diamine, a poly(ethylene oxide-capped oxypropylene) ether diamine, a triethyleneglycoldiamine, a propylene oxide-based triamine, a trimethylolpropane-based triamine, a glycerin-based triamine, diamines prepared from dibasic acids, amine-terminated polybutadiene, and mixtures thereof.

19. The method of claim 1, wherein the at least one saturated curing agent is a hydroxy-terminated curing agent, an amine-terminated curing agent, or a mixture thereof.

20. The method of claim 19, wherein the at least one hydroxy-terminated curing agent is selected from the group consisting of ethylene glycol, diethylene glycol, polyethylene glycol, propylene glycol, 2-methyl-1,3-propanediol, 2,-methyl-1,4-butanediol, dipropylene glycol, polypropylene glycol, 1,2-butanediol, 1,3-butanediol, 1,4-butanediol, 2,3-butanediol, 2,3-dimethyl-2,3-butanediol, trimethylolpropane, cyclohexyldimethylol, triisopropanolamine, tetra-(2-hydroxypropyl)-ethylene diamine, diethylene glycol di-(aminopropyl) ether, 1,5-pentanediol, 1,6-hexanediol, 1,3-bis-(2-hydroxyethoxy) cyclohexane, 1,4-cyclohexyldimethylol, 1,3-bis-[2-(2-hydroxyethoxy)ethoxy]cyclohexane, 1,3-bis-{2-[2-(2-hydroxyethoxy)ethoxy]ethoxy}cyclohexane, trimethyloipropane, polytetramethylene ether glycol, and mixtures thereof.

21. The method of claim 19, wherein the at least one amine-terminated curing agent is selected from the group consisting of ethylene diamine, hexamethylene diamine, 1-methyl-2,6-cyclohexyl diamine, tetrahydroxypropylene ethylene diamine, 2,2,4- and 2,4,4-trimethyl-1,6-hexanediamine, 4,4'-bis-(sec-butylamino)-dicyclohexylmethane, 1,4-bis-(sec-butylamino)-cyclohexane, 1,2-bis-(sec-butylamino)-cyclohexane, derivatives of 4,4'-bis-(sec-butylamino)-dicyclohexylmethane, 4,4'-dicyclohexylmethane diamine, 1,4-cyclohexane-bis-(methylamine), 1,3-cyclohexane-bis-(methylamine), diethylene glycol di-(aminopropyl) ether, 2-methylpentamethylene-diamine, diaminocyclohexane, diethylene triamine, triethylene tetramine, tetraethylene pentamine, propylene diamine, 1,3-diaminopropane, dimethylamino propylamine, diethylamino propylamine, imido-bis-propylamine, monoethanolamine, diethanolamine, triethanolamine, monoisopropanolamine, diisopropanolamine, isophoronediamine, 3,3'-dimethyl-4,4'-bis-(sec-butylamino)-dicyclohexylmethane; N,N'-diisopropyl-isophorone diamine; 3-{[(5-amino-1,3,3-trimethylcyclohexyl)methyl]amino}-propanenitrile and mixtures thereof.

22. The method of claim 1, wherein the at least one of a saturated polyurea prepolymer, the saturated polyurethane prepolymer, or mixture thereof and the at least one saturated curing agent is further mixed with one or more catalysts.

23. The method of claim 22, wherein the castable liquid reactive material has an equivalent ratio of at least one saturated polyurea prepolymer or at least one saturated polyurethane prepolymer to at least one saturated curing agent of about 0.8:1 to about 1.2:1.

24. The method of claim 22, wherein the one or more catalysts is selected from the group consisting of bismuth catalyst, zinc octoate, di-butyltin dilaurate, di-butyltin diacetate, tin (II) chloride, tin (IV) chloride, di-butyltin dimethoxide, dimethyl-bis[1-oxonedecyl)oxy]stannane, di-n-octyltin bis-isooctyl mercaptoacetate, triethylenediamine, triethylamine, tributylamine, oleic acid, acetic acid; delayed catalysts, and mixtures thereof.

25. The method of claim 22, wherein the one or more catalysts are present in an amount from about 0.001 percent to about 5 percent by weight of the castable reactive liquid material.

26. A cosmetically defect-free golf ball component formed from a method comprising the steps of:
providing a golf ball precursor; mixing at least one of a saturated polyurea prepolymer, a saturated polyurethane prepolymer, or mixture thereof and at least one saturated curing agent to form a castable reactive liquid material;
filling a first set of mold halves with a first amount of the material;
cooling the golf ball precursor such that the golf ball precursor has a temperature of about 20° F. to about 50° F., lowering the cooled golf ball precursor into the first set of mold halves after a first predetermined time, wherein the precursor is held by vacuum for second predetermined time, and wherein the second predetermined time is sufficient for complete exothermic reaction of the first amount of material;
releasing the golf ball precursor from the vacuum providing a partially covered golf ball precursor;
filling a second set of mold halves with a second amount of the material, wherein the first and second amounts are substantially similar, and wherein an exothermic reaction of the second amount commences; and
mating the second set of mold halves with the partially covered precursor after a third predetermined time, wherein the mold halves are mated for a fourth predetermined time that is sufficient for complete exothermic reaction of the second amount of material.

27. A method of forming a cosmetically defect-free golf ball component comprising the steps of:
   providing a golf ball precursor;
   mixing at least one of a saturated polyurea prepolymer, a saturated polyurethane prepolymer, or mixture thereof and at least one saturated curing agent to form a castable reactive liquid material;
   filling a first mold half with a first amount of the material, wherein the first mold half is at room temperature or preheated to a temperature of between about 65° F. to about 140° F.;
   cooling the golf ball precursor such that the golf ball precursor has a temperature of about 20° F. to about 50° F., lowering the cooled golf ball precursor into the first set of mold halves after a first predetermined time, wherein the precursor is held by vacuum for second predetermined time, and wherein the second predetermined time is sufficient for complete exothermic reaction of the first amount of material;
   releasing the golf ball precursor from the vacuum providing a partially covered golf ball precursor;
   filling a second mold half with a second amount of the material, wherein the second mold half is at room temperature or preheated to a temperature of between about 65° F. to about 140° F., wherein the first and second amounts are substantially similar, and wherein an exothermic reaction of the second amount commences; and
   mating the second mold half with the partially covered precursor after a third predetermined time, wherein the mold halves are mated for a fourth predetermined time that is sufficient for complete exothermic reaction of the second amount of material.

28. The method of claim 27, wherein the step of providing a golf ball precursor further comprises subjecting the golf ball precursor to a surface treatment.

29. The method of claim 28, wherein the step of subjecting the golf ball precursor to a surface treatment comprises subjecting the golf ball precursor to corona discharge, plasma treatment, or a combination thereof.

30. The method of claim 28, wherein the step of subjecting the golf ball precursor to a surface treatment comprises subjecting the golf ball precursor to corona discharge.

31. The golf ball component of claim 26, wherein the golf ball precursor has a temperature of about 25° F. to about 40° F.

32. The golf ball component of claim 26, wherein the temperature of the first and second sets of mold halves are each independently at a temperature of between about 65° F. to about 100° F.

* * * * *